US012700030B2

(12) United States Patent　　　(10) Patent No.:　US 12,700,030 B2
Coker et al.　　　　　　　　　　　　(45) **Date of Patent:　　*Aug. 4, 2026**

(54) PRODUCT RELEASE SYSTEM, METHOD AND DEVICE HAVING A CUSTOMIZABLE PREPURCHASE FUNCTION

(71) Applicant: Draft2Digital, LLC, Oklahoma City, OK (US)

(72) Inventors: Mark Charles Coker, Los Gatos, CA (US); William James Kendrick, Olympia, WA (US)

(73) Assignee: DRAFT2DIGITAL, LLC, Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/871,480

(22) Filed: Jul. 22, 2022

(65) Prior Publication Data

US 2022/0358568 A1　　Nov. 10, 2022

Related U.S. Application Data

(63) Continuation of application No. 16/659,997, filed on Oct. 22, 2019, now Pat. No. 11,430,050.

(51) Int. Cl.
　　*G06Q 30/00*　　　(2023.01)
　　*G06Q 20/28*　　　(2012.01)
　　　　　　(Continued)

(52) U.S. Cl.
　　CPC ......... *G06Q 30/0641* (2013.01); *G06Q 20/28* (2013.01); *G06Q 20/401* (2013.01);
　　　　　　(Continued)

(58) Field of Classification Search
　　CPC .. G06Q 30/0641; G06Q 20/28; G06Q 20/401; G06Q 30/0276; G06Q 30/0623; G06Q 30/0633; G06Q 20/405
　　See application file for complete search history.

(56) References Cited

U.S. PATENT DOCUMENTS 5,960,411 A 　 9/1999 　 Hartman et al.
6,611,812 B2 * 　 8/2003 　 Hurtado ................. H04L 69/329
　　　　　　　　　　　　　　　　　　705/76

(Continued)

FOREIGN PATENT DOCUMENTS

JP 　　 2006301954 A 　 11/2006

OTHER PUBLICATIONS

"Chili Peppers album, tickets go on 'pre-sale' on iTunes," The Online Reporter (Rider Research) 487: 7(1), Rider Research, Inc. (Apr. 8, 2006) (Year: 2006).*

(Continued)

*Primary Examiner* — Anne M Georgalas
(74) *Attorney, Agent, or Firm* — Haverstock & Owens, A Law Corporation

(57) ABSTRACT

A product release system, method and device that enables product controllers to generate product listings for one or more products as well as one or more customized prepurchase events for each of the products. The product release system, method and device then executes the prepurchase events according to one or more pricing, timing and permission conditions specified for each of the prepurchase events, facilitates the purchasing of the products during the prepurchase events and notifies the product controllers of the results of the prepurchase events.

38 Claims, 6 Drawing Sheets

(51) Int. Cl.
    *G06Q 20/40*     (2012.01)
    *G06Q 30/0241*    (2023.01)
    *G06Q 30/0601*    (2023.01)
(52) U.S. Cl.
    CPC ..... *G06Q 30/0276* (2013.01); *G06Q 30/0623* (2013.01); *G06Q 30/0633* (2013.01)

(56)            References Cited

U.S. PATENT DOCUMENTS

| | | | |
|---|---|---|---|
| 7,139,721 B2 | 11/2006 | Borders et al. | |
| 7,177,825 B1 | 2/2007 | Borders et al. | |
| 7,194,418 B2 | 3/2007 | Smith | |
| 7,233,907 B2 | 6/2007 | Young | |
| 7,472,077 B2 | 12/2008 | Roseman | |
| 7,493,274 B2 | 2/2009 | Bezos et al. | |
| 7,529,712 B2 * | 5/2009 | Heaven | H04L 63/102 |
| | | | 705/52 |
| 7,584,123 B1 * | 9/2009 | Karonis | G06Q 40/04 |
| | | | 705/37 |
| 7,660,738 B1 | 2/2010 | Siegel et al. | |
| 7,778,853 B2 * | 8/2010 | Sussman | G06Q 30/0283 |
| | | | 705/37 |
| 7,865,379 B2 | 1/2011 | Sussman et al. | |
| 8,176,177 B2 * | 5/2012 | Sussman | H04L 43/0894 |
| | | | 709/225 |
| 8,315,918 B1 | 11/2012 | Karonis et al. | |
| 8,424,048 B1 | 4/2013 | Lyren | |
| 8,601,373 B1 | 12/2013 | Ackley | |
| 9,900,220 B2 | 2/2018 | Sussman et al. | |
| 10,650,440 B1 * | 5/2020 | Yee | G06Q 20/28 |
| 10,733,628 B1 * | 8/2020 | Lefkofsky | G06Q 30/0257 |
| 2002/0069282 A1 | 6/2002 | Reisman | |
| 2003/0083961 A1 * | 5/2003 | Bezos | G06Q 30/02 |
| | | | 705/26.8 |
| 2004/0128224 A1 * | 7/2004 | Dabney | G06Q 40/00 |
| | | | 705/37 |
| 2006/0247976 A1 * | 11/2006 | Posokhow | G06Q 30/06 |
| | | | 705/26.81 |
| 2006/0248113 A1 | 11/2006 | Leffert | |
| 2007/0055554 A1 | 3/2007 | Sussman | |
| 2007/0143212 A1 | 6/2007 | Smith | |
| 2008/0004977 A1 | 1/2008 | Fisher | |
| 2008/0097825 A1 | 4/2008 | Leach | |
| 2008/0262937 A1 | 10/2008 | Willis | |
| 2009/0271499 A1 | 10/2009 | Reisman | |
| 2010/0274595 A1 | 10/2010 | Goodpasture | |
| 2010/0287155 A1 | 11/2010 | Reisman | |
| 2012/0117625 A1 | 5/2012 | Ray | |
| 2013/0046650 A1 | 2/2013 | Geurts | |
| 2014/0025535 A1 * | 1/2014 | Douglas | G06Q 10/063 |
| | | | 705/26.8 |
| 2014/0278612 A1 | 9/2014 | Carnahan | |
| 2015/0019307 A1 | 1/2015 | Girard et al. | |
| 2015/0058161 A1 * | 2/2015 | Gura | G06Q 10/087 |
| | | | 705/26.8 |
| 2015/0294284 A1 | 10/2015 | Soon-Shiong | |
| 2017/0178034 A1 | 6/2017 | Skeen et al. | |
| 2017/0178171 A1 * | 6/2017 | Yamada | G06Q 30/06 |
| 2018/0089709 A1 * | 3/2018 | Rousseau-Villella | |
| | | | G06Q 30/0224 |
| 2018/0240182 A1 * | 8/2018 | Schonfeld | G06Q 30/0641 |
| 2019/0026803 A1 | 1/2019 | DeGuzman | |
| 2019/0279121 A1 | 9/2019 | Fletcher | |

OTHER PUBLICATIONS

"Fallout 76 Release Date: When is Fallout 76 Beta Preload out? How to Access the Beta?", by Tom Fish, Express (Online) [London [UK]], Oct. 29, 2018 (Year: 2018).*

"Division 2 Beta Live: Private beta dates, start time, how to get PS4, Xbox codes," by Liam Martin, Express (Online) {London (UK)], Feb. 7, 2019 (Year: 2019).*
"Xbox One Games news: PS4 fans left waiting as Microsoft get early access release," by Gary Jones, Express (Online) [London (UK)] , Feb. 17, 2019 (Year: 2019).*
EA Unveils Special Editions of Star Wars; The Old Republic-Available for Pre-Order Starting Today, Business Wire, Jul. 21, 2011 (Year 2011).
"Dont throw away your shot: Here's what you need to do to get KC 'Hamilton' tickets", by Eric Adler, The Kansas City Star, Evening ed. {Kansas City, MO} Apr. 23, 2019 (Year 2019).
www.nike.com/nike-app, pp. 1-7.
Joshua Espinoza, "How Nike's SNKRS App Is Changing the Shoe-Drop Game for the Better", Jun. 8, 2018, pp. 1-4.
"Jay-Z, Samsung Team Up On Exclusive Early Release of 1 Million New Hova Albums", NEWROCKSTARS, Jun. 17, 2013.
https://heathotsauce.com/blogs/heatblog/black-friday-sales, Nov. 22, 2018.
Kage Taylor, "MAC Selena Quintanilla Announces Exclusive Pre-Release", Jul. 24, 2016.
"B&N Now Pitching "Nook First Look" Promo Service to Indie Authors", The Digital Reader, Aug. 16, 2017.
https://business.ticketmaster.com/blog/taylor-swift-ticketmaster-verified-fan/, "Taylor Swift and Ticketmaster Verified Fan Prove to Be a Perfect Pair".
https://help.ticketmaster.com/s/article/How-do-presales-work?language=en_US, "How do presales work?".
International Preliminary Report on Patentability, mailed May 5, 2022 for International Application No. PCT/US2020/055317, 11 pages.
The International Search Report and Written Opinion from the International Application No. PCT/US2020/055317 dated Jan. 19, 2021.
"How Indie Authors Can Use Preorders To Crack The Bestseller Lists," Publishers Weekly 262.47: n/a PWxyz, LLC (Nov. 2015) (Year: 2015).
Jay Greene, "Amazon to Offer Free Digital Books to Prime Customers" The Seattle Times (Seattle, Wash), Nov. 2, 2013 (Year:2013).
Nick Hughes, "Digital Games Against Physical Games," University Wire (Carlsbad), Apr. 5, 2018 (Year:2018).
"Sith or Republic? Choose Your Side as Early Game Access for Starwars: The Old Republic Begins Today," Business Wire, Dec. 13, 2011 (Year:2011).
"Safari Books Online Enhances E-Reference Shervice With Community Features for Manuscripts-In-Progress Book Content," Business Wire (New York), Jan. 31, 2008 (Year:2008).
The Extended European Search Report issued Aug. 28, 2028, for the European Patent Application No. 20878305.0.
Ghost Recon Breakpoint release dated, launch times: How to get early access on PS4, Xbox, by Liam Martin, Express (Online)[London (UK)] Oct. 1, 2019 (Year: 2019).
The Examiner's Report dated Jul. 10, 2025 from Canadian Patent Application No. 3,158,508.
Examination Report in Australian Patent Application No. 2020369926, dated Apr. 30, 2025, 6 pages.
A Decision on Rejection dated Mar. 4, 2025, for Japanese Patent Application No. 2022-524139.
The Office Action dated Sep. 20, 2025 from Chinese Patent Application No. 202080089177.7.
Hearing Notice dated Dec. 23, 2025, in Reference of Application No. 202217025334.
The Second Examination Report dated Jan. 7, 2026, issued in the Australian Patent Application No. 2020369926.

* cited by examiner

200

202    204    206    208    220

Network Interface

Memory

Bus

Processor    I/O    HW

210

230

Software

Storage

212

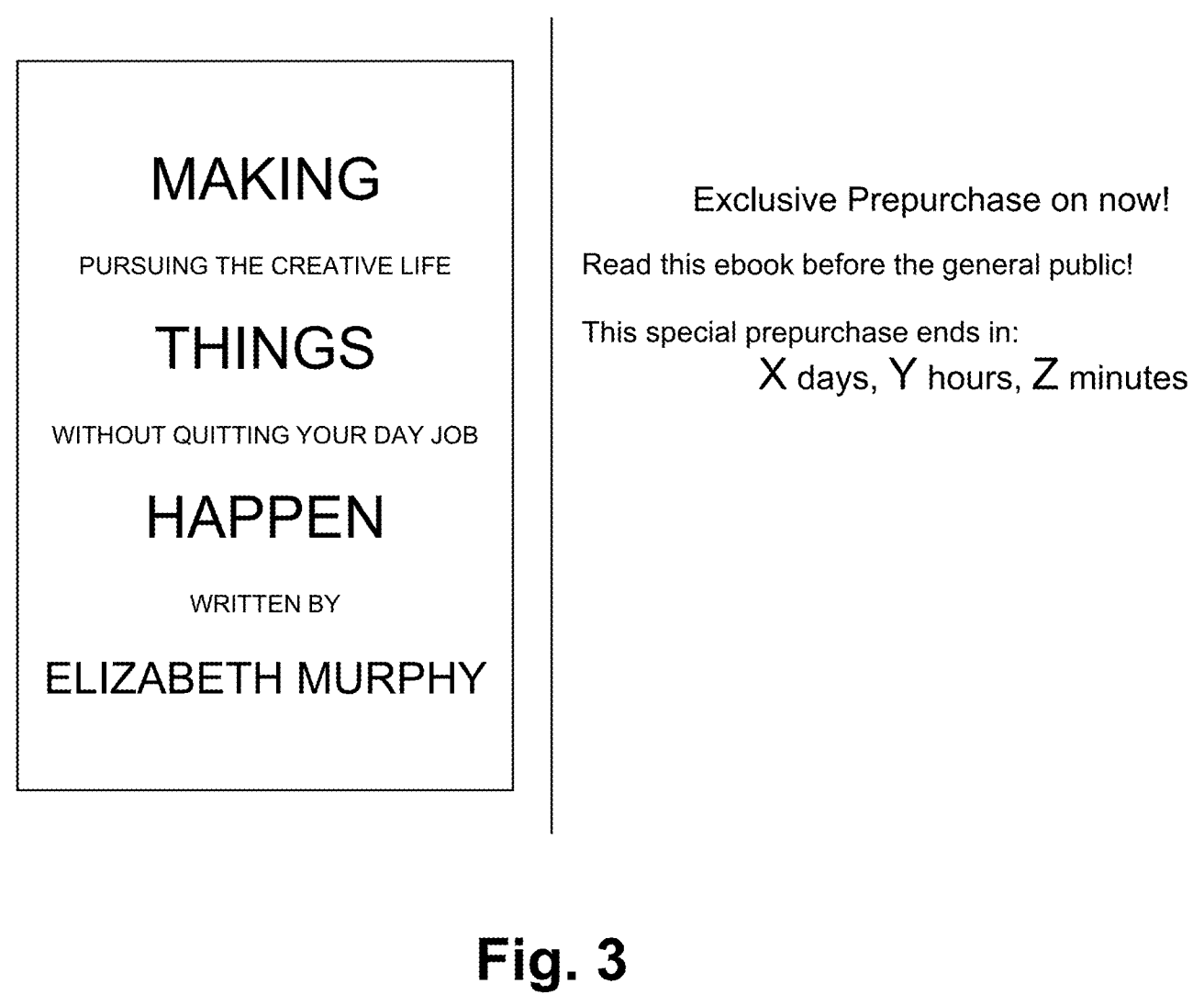

Exclusive Prepurchase on now!

Read this ebook before the general public!

This special prepurchase ends in:
X days, Y hours, Z minutes

MAKING

PURSUING THE CREATIVE LIFE

THINGS

WITHOUT QUITTING YOUR DAY JOB

HAPPEN

WRITTEN BY

ELIZABETH MURPHY

Fig. 3

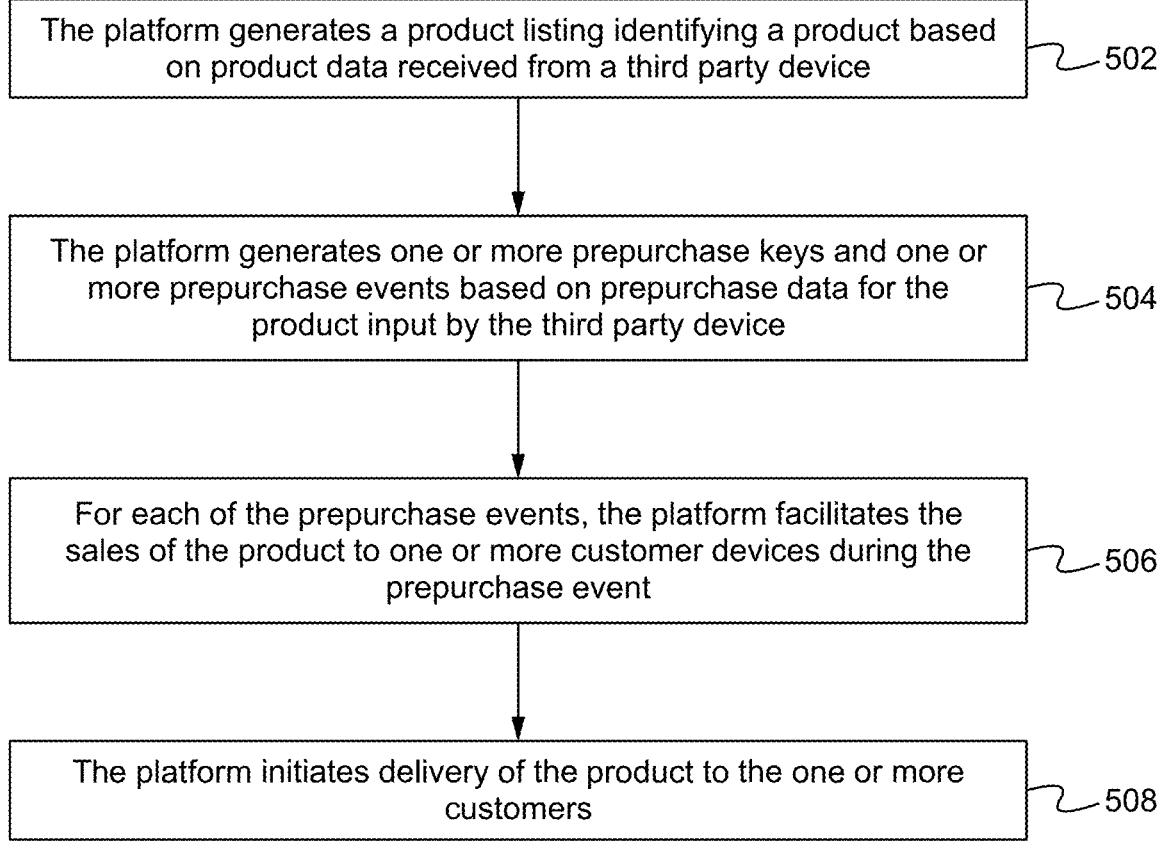

The platform generates a product listing identifying a product based on product data received from a third party device ⌇⌐502

The platform generates one or more prepurchase keys and one or more prepurchase events based on prepurchase data for the product input by the third party device ⌇⌐504

For each of the prepurchase events, the platform facilitates the sales of the product to one or more customer devices during the prepurchase event ⌇⌐506

The platform initiates delivery of the product to the one or more customers ⌇⌐508

Fig. 5

PRODUCT RELEASE SYSTEM, METHOD AND DEVICE HAVING A CUSTOMIZABLE PREPURCHASE FUNCTION

RELATED APPLICATIONS

This application is a continuation of co-pending U.S. patent application Ser. No. 16/659,997, filed on Oct. 22, 2019 and entitled "A PRODUCT RELEASE SYSTEM, METHOD AND DEVICE HAVING A CUSTOMIZABLE PREPURCHASE FUNCTION," which is hereby incorporated by reference.

FIELD OF THE INVENTION

The present invention relates to the field of new product releases. Specifically, the present invention relates to a product release system, method and device that enables customizable prepurchases before a new product's regularly scheduled public release date.

BACKGROUND OF THE INVENTION

The advent of ecommerce has created exciting product launch opportunities for the creators of new physical and digital products. Product creators use third-party controlled ecommerce merchants and marketplaces (herein referred to as "online merchants") to reach consumers around the globe.

Because online merchant "shelf space" is virtual rather than physical, this shelf space is infinitely scalable at low cost. This low cost scalability allows online merchants to list and sell a wider variety of products from more product creators than ever before. The low cost of virtual shelf space also allows online merchants to continue listing and selling even low-selling products long after most physical brick and mortar stores would have discontinued them.

Product listings can forever occupy the online merchant's virtual shelves, forever competing against one another for the attention of consumers. As a result, it's more difficult than ever for product creators to make their product listings stand out. The competition for product discoverability is fierce. Every day from this day forward, any individual or company that wants to sell anything online will face virtual shelves glutted with competition that grows more glutted by the day.

Product creators begin planning their new product introductions months or years in advance. The product creator will often evaluate their product development schedule, consider logistical and seasonal product marketing considerations, and then create a product launch timeline to release the product at a future date. Their product development, manufacturing and marketing will revolve around this single product release date.

For consumers, new product introductions are exciting because new products promise important innovations over what came before. Often, what's coming and what's new is more exciting to consumers than older products.

This consumer preference for new and upcoming products creates unique challenges for product creators and their marketing teams, especially when considering the finality of the product introduction date. It means the product creator has only one chance to make a splash before their upcoming new product launch event becomes yesterday's news.

SUMMARY OF THE INVENTION

A product release system, method and device that enables product controllers to generate product listings for one or more products as well as one or more customized prepurchase events for each of the products. The product release system, method and device then executes the prepurchase events according to one or more pricing, timing and permission conditions specified for each of the prepurchase events, facilitates the purchasing of and/or access to the products during the prepurchase events and notifies product creators of the results of the prepurchase events.

A first aspect is directed to a product release system for enabling prepurchase of one or more products. The product release system comprises one or more servers including a processor and a non-transitory computer-readable medium coupled with the processor, storing a product release platform having a user interface and able to be communicatively coupled with one or more third party devices over a network, wherein the product release platform is operable to generate a product listing identifying a product based on product data received from a third party device, wherein the product data includes a product release date, and metadata associated with the product, generate one or more prepurchase keys and one or more prepurchase events based on prepurchase data for the product indicated by the third party device, wherein the prepurchase data includes a starting time, an end condition and pricing data for each of the prepurchase events, wherein the starting time is before the product release date and for each of the prepurchase events, facilitate access to the product to one or more customers during the prepurchase event if one or more keys submitted by the customers correspond to the prepurchase keys associated with the prepurchase event and prevent access to the product to the one or more customers during the prepurchase event if the one or more keys submitted by the customers do not correspond to the prepurchase keys associated with the prepurchase event.

In some embodiments, each of the keys is included within a hyperlink that links to a page associated with the prepurchase event of that key and submits the key to the product release platform for determining if the key corresponds to the prepurchase keys associated with the prepurchase event. In some embodiments, the end condition is one or more of an end time, a quantity of sales, a maximum quantity of customers accessing the prepurchase event, an inventory status of the product, and a manual cancellation of the event, and further wherein, for each of the prepurchase events, upon reaching the end condition the product release platform is operable to terminate the prepurchase event. In some embodiments, the pricing data is a pricing metric that indicates a price value for the starting time and one or more subsequent times between the starting time and an end of the prepurchase event as indicated by the end condition. In some embodiments, the prepurchase data includes one or more prepurchase conditions, and further wherein, for each of the prepurchase events, the product release platform is operable to prevent sales of the product to one or more of the consumers even if the submitted key corresponds to the prepurchase keys associated with the prepurchase event if the one or more of the consumers have not satisfied the prepurchase conditions.

In some embodiments, the prepurchase conditions comprise one or more of submitting contact information, purchasing or subscribing to one or more other products spending a threshold amount of money and agreeing to a terms of use of the product. In some embodiments, an account database is stored on the non-transitory computer-readable medium and includes a plurality of accounts each having a set of customer contact information, and further wherein, for each of the prepurchase events, the prepurchase data includes identification of all or a subset of one of the sets of customer contact information and the product release platform is operable to transmit the prepurchase key to network accessible locations identified by the subset of the one of the sets of customer contact information. In some embodiments, the product release platform is operable to add the contact information submitted to satisfy the prepurchase conditions to the one of the sets of customer contact information of the account associated with the prepurchase event.

In some embodiments, for each of the prepurchase events, the product release platform is operable to generate a prepurchase listing that identifies the product based on the metadata, the release date of the product and the starting time of the prepurchase event. In some embodiments, the product release platform is operable to generate one or more prepurchase preorder keys and one or more prepurchase preorder events based on prepurchase preorder data for the product indicated by the third party device, wherein the prepurchase preorder data includes information that identifies one of the prepurchase events, for each of the prepurchase preorder events, facilitate ordering of the product by one or more customers during the prepurchase preorder event if one or more prepurchase preorder keys submitted by the customers correspond to the prepurchase preorder keys associated with the prepurchase preorder event and prevent ordering of the product by the one or more customers during the prepurchase preorder event if the one or more prepurchase preorder keys submitted by the customers do not correspond to the prepurchase preorder keys associated with the prepurchase preorder event and facilitate the purchase of the product by the one or more customers that ordered the product during the identified one of the prepurchase events. In some embodiments, the product data includes a content file containing the product and the content file comprises one or more of the group consisting of: a digital book, an image, a video, audio, a computer application.

A second aspect is directed to a method of enabling prepurchase of one or more products via one or more product release servers. The method comprises generating, with the product release servers, a product listing identifying a product based on product data received from a third party device, wherein the product data includes a product release date, and metadata associated with the product, generating, with the product release servers, one or more prepurchase keys and one or more prepurchase events based on prepurchase data for the product indicated by the third party device, wherein the prepurchase data includes a starting time, an end condition and pricing data for each of the prepurchase events, and wherein the starting time is before the product release date and for each of the prepurchase events, with the product release servers, facilitating access to the product to one or more customers during the prepurchase event if one or more keys submitted by the customers correspond to the prepurchase keys associated with the prepurchase event and preventing sales of the product to the one or more customers during the prepurchase event if the one or more keys submitted by the customers do not correspond to the prepurchase keys associated with the prepurchase event.

In some embodiments, each of the keys is included within a hyperlink that links to a page associated with the prepurchase event of that key and submits the key to the product release servers for determining if the key corresponds to the prepurchase keys associated with the prepurchase event. In some embodiments, the end condition is one or more of an end time, a quantity of sales, a maximum quantity of customers accessing the prepurchase event, an inventory status of the product and manual cancellation of the event, and further wherein, for each of the prepurchase events, upon reaching the end condition the product release platform is operable to terminate the prepurchase event. In some embodiments, the pricing data is a pricing metric that indicates a price value for the starting time and one or more subsequent times between the starting time and an end of the prepurchase event as indicated by the end condition. In some embodiments, the prepurchase data includes one or more prepurchase conditions, further comprising, for each of the prepurchase events, preventing sales of the product to one or more of the consumers with the product release servers even if the submitted key corresponds to the prepurchase keys associated with the prepurchase event if the one or more of the consumers have not satisfied the prepurchase conditions.

In some embodiments, the prepurchase conditions comprise one or more of submitting contact information, purchasing or subscribing to one or more other products, spending a threshold amount of money and agreeing to a terms of use of the product. In some embodiments, the prepurchase data includes identification of all or a subset of one of sets of customer contact information of a plurality of accounts of an account database, further comprising, for each of the prepurchase events, transmitting the prepurchase key to network accessible locations identified by the subset of the one of the sets of customer contact information with the product release servers. In some embodiments, the method further comprises adding the contact information submitted to satisfy the prepurchase conditions to the one of the sets of customer contact information of the account associated with the prepurchase event with the product release servers. In some embodiments, the method further comprises, for each of the prepurchase events, generating with the product release servers a prepurchase listing that identifies the product based on the metadata, the release date of the product and the starting time of the prepurchase event.

In some embodiments, the method further comprises generating one or more prepurchase preorder keys and one or more prepurchase preorder events with the product release servers based on prepurchase preorder data for the product indicated by the third party device, wherein the prepurchase preorder data includes information that identifies one of the prepurchase events, for each of the prepurchase preorder events, with the product release servers, facilitating ordering of the product by one or more customers during the prepurchase preorder event if one or more prepurchase preorder keys submitted by the customers correspond to the prepurchase preorder keys associated with the prepurchase preorder event and preventing ordering of the product by the one or more customers during the prepurchase preorder event if the one or more prepurchase preorder keys submitted by the customers do not correspond to the prepurchase preorder keys associated with the prepurchase preorder event and facilitating access to the product by the one or more customers that ordered the product during the identified one of the prepurchase events with the product release servers. In some embodiments, the product data includes a content file containing the product and the content file comprises one or more of the group consisting of: a digital book, an image, a video, audio, a computer application.

A third aspect is directed to a non-transitory computer-readable medium storing a product release platform configured to generate a product listing identifying a product based on product data received from a third party device, wherein the product data a product release date, and metadata associated with the product; generate one or more prepurchase keys and one or more prepurchase events based on prepurchase data for the product indicated by the third party device, wherein the prepurchase data includes a starting time, an end condition and pricing data for each of the prepurchase events, wherein the starting time is before the product release date; and for each of the prepurchase events, facilitate access to the product to one or more customers during the prepurchase event if one or more keys submitted by the customers correspond to the prepurchase keys associated with the prepurchase event and prevent sales of the product to the one or more customers during the prepurchase event if the one or more keys submitted by the customers do not correspond to the prepurchase keys associated with the prepurchase event.

In some embodiments, each of the keys is included within a hyperlink that links to a page associated with the prepurchase event of that key and submits the key to the product release platform for determining if the key corresponds to the prepurchase keys associated with the prepurchase event. In some embodiments, the end condition is one or more of an end time, a quantity of sales, a maximum quantity of customers accessing the prepurchase event, an inventory status of the product and manual cancellation of the event, and further wherein, for each of the prepurchase events, upon reaching the end condition the product release platform is operable to terminate the prepurchase event. In some embodiments, the pricing data is a pricing metric that indicates a price value for the starting time and one or more subsequent times between the starting time and an end of the prepurchase event as indicated by the end condition. In some embodiments, the prepurchase data includes one or more prepurchase conditions, and further wherein, for each of the prepurchase events, the product release platform is operable to prevent sales of the product to one or more of the consumers even if the submitted key corresponds to the prepurchase keys associated with the prepurchase event if the one or more of the consumers have not satisfied the prepurchase conditions.

In some embodiments, the prepurchase conditions comprise one or more of submitting contact information, purchasing or subscribing to one or more other products, spending a threshold amount of money and agreeing to a terms of use of the product. In some embodiments, the medium further comprises an account database stored on the non-transitory computer-readable medium, the account database including a plurality of accounts each having a set of customer contact information, and further wherein, for each of the prepurchase events, the prepurchase data includes identification of all or a subset of one of the sets of customer contact information and the product release platform is operable to transmit the prepurchase key to network accessible locations identified by the subset of the one of the sets of customer contact information. In some embodiments, the product release platform is operable to add the contact information submitted to satisfy the prepurchase conditions to the one of the sets of customer contact information of the account associated with the prepurchase event. In some embodiments, for each of the prepurchase events, the product release platform is operable to generate a prepurchase page that identifies the product based on the metadata, the release date of the product and the starting time of the prepurchase event.

In some embodiments, the product release platform is operable to generate one or more prepurchase preorder keys and one or more prepurchase preorder events based on prepurchase preorder data for the product indicated by the third party device, wherein the prepurchase preorder data includes information that identifies one of the prepurchase events, for each of the prepurchase preorder events, facilitate ordering of the product by one or more customers during the prepurchase preorder event if one or more prepurchase preorder keys submitted by the customers correspond to the prepurchase preorder keys associated with the prepurchase preorder event and prevent ordering of the product by the one or more customers during the prepurchase preorder event if the one or more prepurchase preorder keys submitted by the customers do not correspond to the prepurchase preorder keys associated with the prepurchase preorder event and facilitate access to the product by the one or more customers that ordered the product during the identified one of the prepurchase events. In some embodiments, the product data includes a content file containing the product and the content file comprises one or more of the group consisting of: a digital book, an image, a video, audio, a computer application.

A fourth aspect is directed to a product release system for enabling prepurchase of one or more products. The product release system comprises one or more servers including a processor and a non-transitory computer-readable medium coupled with the processor, storing a product release platform having a user interface and able to be communicatively coupled with one or more third party devices over a network, wherein the product release platform is operable to generate a product listing identifying a product based on product data received from a third party device, wherein the product data includes a product release date, and metadata associated with the product, generate one or more prepurchase events based on prepurchase data for the product indicated by the third party device, wherein the prepurchase data includes a starting time, an end condition and pricing data for each of the prepurchase events, wherein the starting time is before the product release date, for each of the prepurchase events, enable the adjustment of the starting time, the end condition and the pricing data of the prepurchase event and for each of the prepurchase events, facilitate access to the product to one or more customers during the prepurchase event based on the prepurchase data.

In some embodiments, the end condition is one or more of an end time, a quantity of sales, a maximum quantity of customers accessing the prepurchase event, an inventory status of the product and a manual cancellation of the event, and further wherein, for each of the prepurchase events, upon reaching the end condition the product release platform is operable to terminate the prepurchase event. In some embodiments, the pricing data is a pricing metric that indicates a price value for the starting time and one or more subsequent times between the starting time and an end of the prepurchase event as indicated by the end condition. In some embodiments, the prepurchase data includes one or more prepurchase conditions, and further wherein, for each of the prepurchase events, the product release platform is operable to prevent sales of the product to one or more of the consumers if the one or more of the consumers have not satisfied the prepurchase conditions. In some embodiments, the prepurchase conditions comprise one or more of submitting contact information, purchasing or subscribing to one or more other products, spending a threshold amount of money and agreeing to a terms of use of the product.

In some embodiments, for each of the prepurchase events, the product release platform is operable to generate a prepurchase page that identifies the product based on the metadata, the release date of the product and the starting time of the prepurchase event. In some embodiments, the product release platform is operable to generate one or more prepurchase preorder events based on prepurchase preorder data for the product indicated by the third party device, wherein the prepurchase preorder data includes information that identifies one of the prepurchase events, for each of the prepurchase preorder events, facilitate ordering of the product by one or more customers during the prepurchase preorder event and facilitate the purchase of the product by the one or more customers that ordered the product during the identified one of the prepurchase events. In some embodiments, the product data includes a content file containing the product and the content file comprises one or more of the group consisting of: a digital book, an image, a video, audio, a computer application.

BRIEF DESCRIPTION OF THE DRAWINGS

FIG. 3 illustrates a prepurchase page according to some embodiments.

FIG. 5 illustrates a method of enabling prepurchase of one or more products via one or more product release servers according to some embodiments.

DETAILED DESCRIPTION OF THE INVENTION

Figure 1:
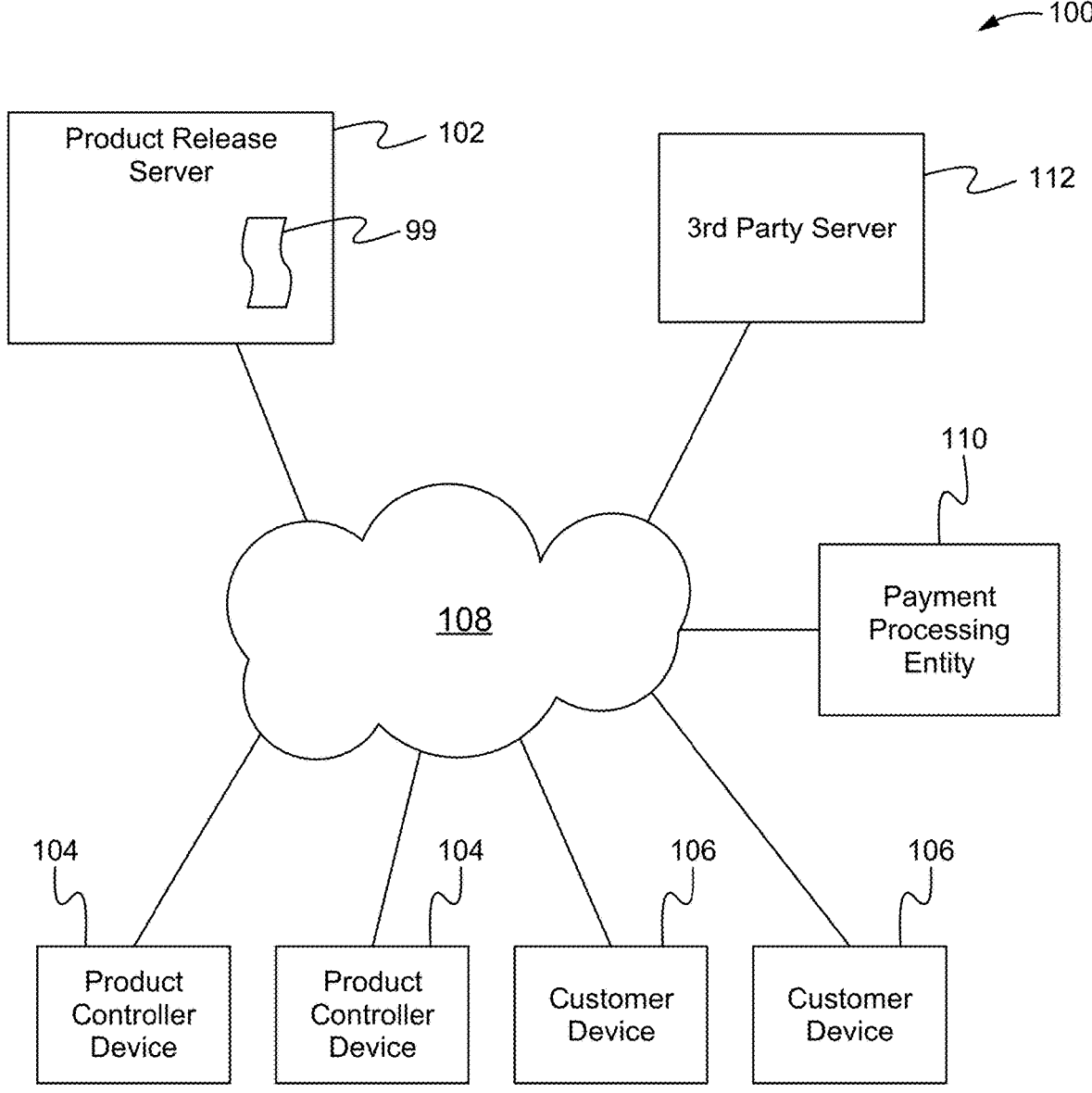
FIG. 1 illustrates a product release system for providing features of a product release platform according to some embodiments.

The advent of ecommerce has created exciting opportunities for the millions of individuals and companies that bring new products to market each year. These products can be physical (e.g. paper books), digital (e.g. ebooks) or services (e.g. financial services). Herein, these products and services that can be listed and sold or subscribed to online are referred to as "products."

Unlike "brick and mortar" retailers that can only stock a small number of items per square foot of physical shelf space, thanks to ecommerce, online merchant shelf space is infinitely scalable at relatively low cost, thereby enabling merchants to stock more products from a greater number of product creators.

Today, it's not uncommon for online merchants to stock tens of thousands or even millions of items.

To support the influx of the millions of new products introduced each year, online merchants have developed sophisticated systems capable of receiving, processing, and publishing thousands of new product listings each week. These systems are highly automated and efficient, for without such automation it would be economically unfeasible for online merchants to open their virtual shelves to accommodate so many product creators and products.

The Limitation of the Conventional Product Release Date

When a new product is listed at an online merchant, one of the most important pieces of metadata is the product release date, also commonly referred to as, "availability date," "launch date," "product introduction date," "public release date," "drop date," or "general availability date" among other similar phraseology. This product release date corresponds to the date at which the product was released at the online merchant in the past, or the date at which a forthcoming new product will release and become purchasable in the future.

New products are exciting to consumers because these products embody innovations intended to satisfy unmet needs and desires of the marketplace. For many consumers, what's new and what's coming in the future is often more exciting than what was already introduced in the past.

The consumer fixation on what's new creates special challenges for product creators. It means the product release date often marks the date of peak consumer excitement and peak sales, after which consumer enthusiasm wanes in favor the next newer shiny object. It means many product creators get only one chance to make their upcoming product launch a success.

Further compounding the product launch challenge for creators is the fact that a new product often appeals to different customer segments for completely different reasons. For example, for a young family with a new infant, a new minivan represents a family transportation vehicle, whereas to an Uber driver, the same minivan represents how the driver will carry out their transportation business. The van's safety features might appeal most to the family, whereas the van's passenger and luggage capacity might be most appealing to the Uber driver. A single release date therefore makes it difficult for product creators to plan and execute marketing campaigns tailored to target various customer segments.

The conventional single release date also makes it difficult for product creators to offer special loyalty incentives to various customer segments when all customers must wait to purchase, receive and/or access (in the case of subscription or rental services) the product on the same release date.

The Discoverability Challenge for New Products

The democratized access to online retail distribution is a mixed blessing for product creators. Although it means that product creators that were previously denied access to physical retail distribution can now gain ubiquitous access to online distribution, the unlimited shelf space aspect of online merchants means that merchant catalogs can swell to millions or even hundreds of millions of items. This means that discoverability is an increasingly difficult challenge for anyone planning to release a new product via ecommerce in the future. Each day, these virtual shelves become more crowded.

Product Creators Turn to Preorders to Raise Visibility of Upcoming New Product Launches Preorders allow product creators to advertise upcoming new product releases in online merchant listings in advance of the product's general release date. When a customer preorders a product, they are placing a purchase order, much like a reservation, that will allow the customer to receive the forthcoming product at a future date (or soon after its official public release date). A preorder listing can raise the visibility of upcoming product launches by enabling product creators and merchants alike to market products to customers in advance of the product's availability.

For both product creators and online merchants, preorder listings make it possible to capture customer order reservations in advance of the product's release date. By monitoring accumulated preorder counts, product producers and merchants can measure anticipated customer demand and make more informed resource allocation decisions about marketing, product manufacturing and inventory levels. For most physical and digital products on preorder, a customer is typically not charged for the product until the product's general release date arrives and the product begins shipping to the customer.

Preorder Limitations

Although preorders open up new opportunities for product creators and merchants to market new products online, most customers do not take advantage of preorders, and this in turn means that most product creators don't take advantage of preorders. The majority of customers opt instead to wait until after the product's general release date arrives to make their purchase. After all, as customer thinking goes, why should a consumer order a product weeks or months in advance only to receive the product at the same time as everyone else, or when other products can be purchased now to meet similar needs?

A New Method and System for Merchandising and Marketing New Product Releases at Scale Embodiments described herein disclose a system, method and devices that greatly expand the conventional temporal timeline for new product introductions.

The system enables creators of physical and digital products, as well as other members of the product supply chain (e.g. merchants, and distributors that supply merchants) that help product creators bring these products to market via online merchants, to raise the visibility and desirability of upcoming product releases, and to more effectively target different customer segments with the same product. The system enables online merchants to efficiently receive, process and publish these product listings at scale. Further, by operating at scale the system enables more online merchants and product creators to take advantage of this new opportunity to market new products more effectively to customers.

FIG. 1 illustrates a product release system 100 for providing features of a product release platform 99 according to some embodiments. As shown in FIG. 1, the system 100 comprises one or more product release servers 102, one or more product controller devices 104, one or more buyer or customer devices 106, a payment processing entity 110 and one or more third party servers 112, all coupled together over one or more networks 108. Alternatively, the third party servers 112 are able to be omitted. The networks 108 are able to be one or a combination of wired or wireless networks as are well known in the art. Although as shown in FIG. 1 one product release server 102 is coupled with two product controller devices 104, one third party server 112 and two customer devices 106, it is understood that the system 100 is able to comprise any number of servers 102, product controller devices 104, third party server 112 and/or customer devices 106 coupled together via the network 108. As used herein "product controller" is able to refer to any entity having control over a product including, but not limited to, product creators (e.g. authors), merchants, suppliers and distributors.

The one or more product release servers 102 are able to store, maintain and/or operate a product release platform 99 for providing the prepurchase and other features described below. In some embodiments, the entirety of the product release platform 99 is able to be provided by the product release servers 102. For example, the product release platform 99 features are able to be provided in the form of one or more websites operated by the product release servers 102. Alternatively, a user is able to download some or all of the product release platform 99 from the product release servers 102 onto one of the product controller devices 104, wherein the product release platform 99 is in the form of a program or application that is able to execute locally on the product controller device 104 and provides some or all of the platform features. In such embodiments, after being downloaded to the product controller device 104, the application is able to use the local memory on the product controller device 104 to store and utilize data necessary for operation of the application in an application database on the product controller device 104. Alternatively, some or all of the data for operating the application is able to be stored in a server database on the product release servers 102 such that the application must connect to the product release servers 102 over the networks 108 in order to utilize the data on the server database. For example, the locally executing application is able to remotely communicate with the product release servers 102 over the network 108 to perform any features of the application and/or access any data on the server database not available with just the data on the application database. In some embodiments, the same data is stored on both the server database and the application database such that either local or remote data access is possible. In such embodiments, the databases are able to be periodically synchronized over the network 108. Alternatively, the product release platform 99 is able to be in the form of a plugin that operates on top of the existing programming of one or a plurality of third party servers 112 and/or websites (e.g. to provide added functionality to a third party website operated by the third party server 112).

In any case, in such embodiments the downloaded application, plugin and/or product release servers 102 together are able to provide all of the features of the product release platform 99 by communicating via the network 108. In other words, together and/or separately the features of the product release platform 99 are able to be provided by one or more plugins operating on other website/servers (e.g. servers 112), one or more websites on the servers 102 and/or a local application on the product controller devices 104. Alternatively, the application and/or plugin is able to provide all of the features of the product release platform 99 without the servers 102. Additionally, it should be noted that, for the sake of brevity, the following discussion relates to the functions and operation of the product release platform 99 in the form of a website, user interface and/or database operating on the product release server 102, however it is understood that the discussion is able to also relate to the function and operation of the application/plugin, the application/plugin user interface and the application/plugin database.

The third party servers 112 are able to be operated by merchants, aggregating entities (e.g. distributors), product creators operating their own direct-to-customer merchant site and/or other network-accessible software and/or hardware entities. Specifically, the third party servers 112 are able to be entities that provide a website or application to distribute and/or facilitate purchase of, or access to (in the case of subscription and rental services) digital or physical products and/or services. The product controller devices 104 and customer devices 106 are able to be any electronic device capable of accessing network accessible locations such as the product release server 102, the third party servers 112 and/or the payment processing entity 110. The payment processing entity 110 is able to be a financial institution capable of executing financial transactions.

Figure 2:
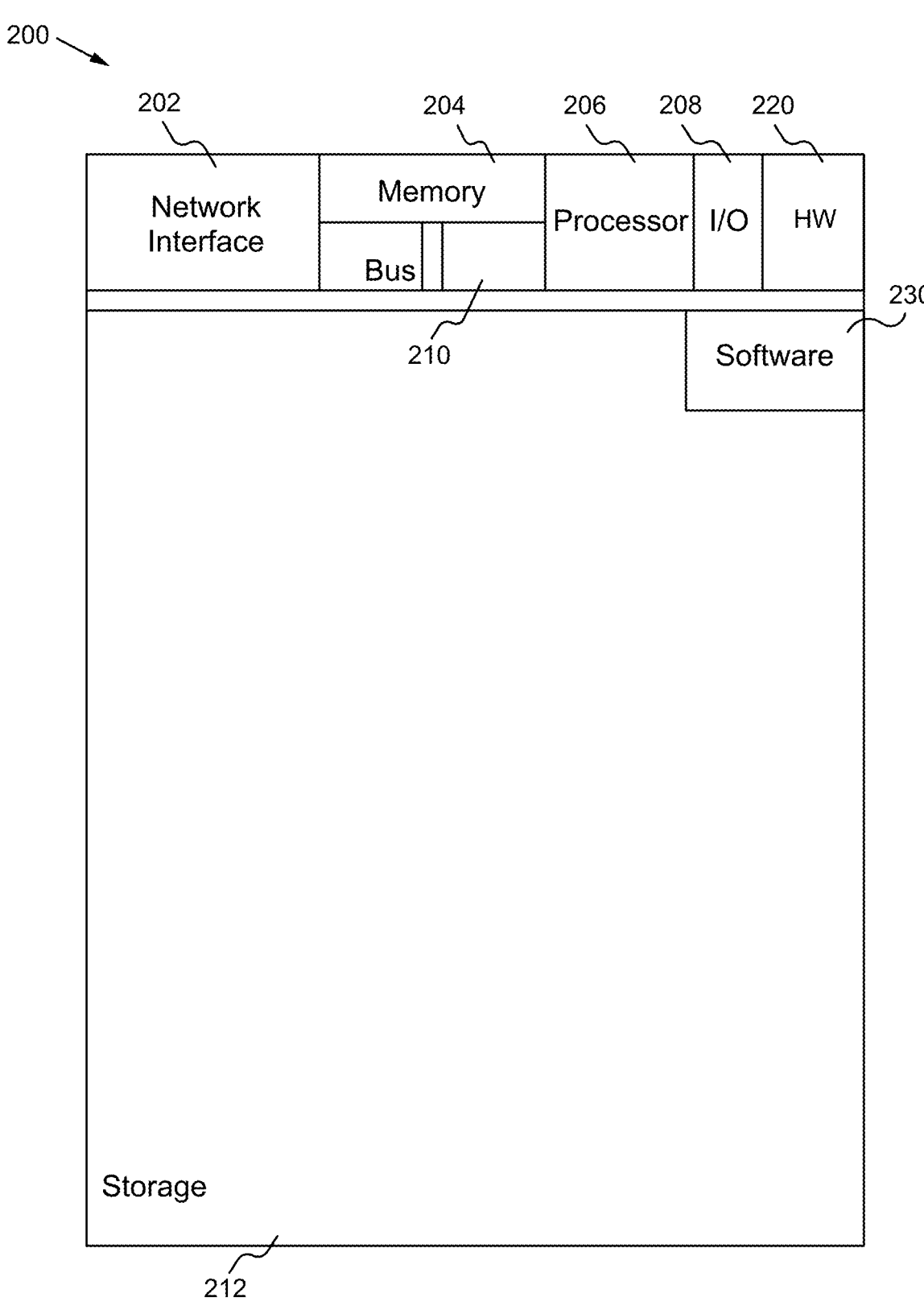
FIG. 2 illustrates a block diagram of an exemplary computing device according to some embodiments.

FIG. 2 illustrates a block diagram of an exemplary computing device 200 according to some embodiments. The computing device 200 is able to be one or more of the servers 102, third party servers 112, product controller devices 104 and/or the customer devices 104. In general, a hardware structure suitable for implementing the computing device 200 includes a network interface 202, a memory 204, a processor 206, I/O device(s) 208, a bus 210 and a storage device 212. Alternatively, one or more of the illustrated components are able to be removed or substituted for other components well known in the art. The choice of processor is not critical as long as a suitable processor with sufficient speed is chosen. The memory 204 is able to be any conventional computer memory known in the art. The storage device 212 is able to include a hard drive, solid state storage, network-attached storage, cloud storage, RAM, SRAM, CDROM, CDRW, DVD, DVDRW, flash memory card or any other storage device. The computing device 200 is able to include one or more network interfaces 202. An example of a network interface includes a network card connected to an Ethernet or other type of LAN. The I/O device(s) 208 are able to include one or more of the following devices capable of inputting or conveying data such as a keyboard, mouse, monitor, display, printer, scanner, modem, touchscreen, button interface, speech recognition interface, and other devices.

The product release platform 99 software or module(s) 230 used to operate the product release platform 99 (e.g. application, plugin and/or website) are likely to be stored in the storage device 212 and memory 204 and processed as applications are typically processed. More or less components shown in FIG. 2 are able to be included in the computing device 200. In some embodiments, platform hardware 220 is included. Although the computing device 200 in FIG. 2 includes software 230 and hardware 220 for the product release platform 99, the features of the product release platform 99 are able to be implemented on the computing device 200 in hardware, firmware, software or any combination thereof. Examples of suitable computing devices include a personal computer, a laptop computer, a computer workstation, a server, a datacenter, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a Blu-ray® writer/player, a television, a home entertainment system or any other suitable computing device including any network-connected terminal with a screen connected to remote computing, I/O processing and data storage resources.

The Product Release Platform

The product release platform 99 enables product controllers to create, launch and manage custom prepurchase events. The product release platform 99 (as implemented by the application, plugin and/or website) is able to comprise multiple enabling capabilities, organized and referred to herein as modules. These modules can be implemented as discrete functional objects within a product release platform, or the functions of certain modules as described may be combined with other modules or omitted. In some embodiments, the functions of one or more of the modules are accessible to users via a graphical user interface. Example modules of the product release platform 99 comprise a login and registration module, a listing generation module, a vetting module, a prepurchase event module, prepurchase preorder module, a dashboard module, a purchase module, an analytics module, a coupon module, a subscriber module, an event bid module and an inventory module, wherein the platform user interface is configured to enable users to utilize the modules.

The Login and Registration Module

The login and registration module enables a user to create an account on the platform by inputting identification/contact information (e.g. username, password information, an email, passcodes, alternate contact methods, biometrics, two-factor authentication using text, voice or email and/or a security token) via the graphical user interface that is then associated with the account such that the identification/contact information is able to be used to identify the user when logging onto the platform. The identification/contact information associated with the account is able to be stored in an account database (e.g. on the servers 102) or another network accessible location. Alternatively, the login information is able to be omitted and a user is able to use the platform without creating a user profile or logging in. In some embodiments, for unregistered customers who wish to purchase a product or service associated with a prepurchase event, the account registration process can be initiated in part—or fully integrated—within the shopping cart checkout process.

After an account is created, the user is able to access the account and any data associated with the account by entering the identification/contact information in order to identify themselves to the platform. In particular, the data associated with the account is able to include one or more products, events associated with the products, data associated with the products and/or events (e.g. sales data, sales analytics, pricing data, product metadata, event rules, event times), and/or a set of previously captured customer contact data (e.g. email addresses, telephone numbers, social media accounts). The customer contact data is able to be associated with the account generally, associated with one or more products associated with the account (e.g. products purchased by the users who the customer contact data is from) and/or associated with one or more events associated with the account. For example, customer contact data is able to be captured by the product release platform through a prepurchase event (as described below) and added to the data for the account associated with that event. This data will then be recorded as associated with the event, the product or service of the event, and the account that created the event. As a result, the owner of the event (e.g. product controller) is able to access and manipulate (e.g. copy, sort, filter, edit, add, delete, download) this data in order to use the data for research and/or general marketing purposes.

In some embodiments, the state of the user when they visit the product release platform 99 is either logged in, or not logged in. If the user visits the product release platform 99 in a logged in state, then the resources, capabilities and personalized features of the product release platform are available to them without taking further action to log in. If a user visits the product release platform 99 and they are not logged in, the module is able to provide the option to enter their email address/password combination, or one or more of the alternate authentication methods mentioned above, or provide the option to create an account via a graphic user interface that collects this information.

The Listing Generation Module

The listing generation module enables an account (e.g. associated with the product controller) to generate a product listing on the product release platform 99 by inputting product data. As described below, this product data is able to be used to generate a product listing as well as prepurchase and/or prepurchase preorder events. The product data is able to comprise one or more of a general release date, a name/title, metadata about the product (e.g. description, product language, categorization, pricing, rating, or other characteristics of the product) and optionally the content file including the product itself (for digital products). For example, the metadata is able to include one or more of a product name, product description, product categories, unique numeric or alphanumeric product identifiers (e.g. international standard book number, barcodes, Universal Product Code (UPC), International European Article Number (EAN), a third party server 112 issued identifier (e.g. merchant issued identifier), or any other instantiation of an identifier), the brand identity of the product controller, customer testimonials, customer reviews, release date, preorder date, prepurchase event start/end date(s), preorder start/end date(s), images, photographs, illustrations, documentation of the product, language of the product, categorization, pricing, rating, inventory and fulfillment status, or other characteristics of the product.

The listing generation module is then able to generate a listing for the product based on the inputted product data (either with or without the content file). If the content file was included in the product data (or the inventory and fulfillment readiness status is satisfactory in the case of a physical product), the generated listing will be a complete listing. If the content file was not included (or the inventory and fulfillment readiness status is unsatisfactory in the case of a physical product), the listing is still able to be generated, but the product will not be able to be generally released/sold/accessed, or sold via a prepurchase event until the content file is added to the product data for the listing or the inventory and fulfillment readiness status is satisfactory/made satisfactory (e.g. the product inventory is in place for customer delivery per the unique rules and requirements that apply to the product). For example, if a product controller attempts to generate a prepurchase event for a listing that does not have a content file (or lacks an acceptable inventory status), the prepurchase generation module is operative to prevent completion of the prepurchase event (e.g. publication of a prepurchase event page) and/or automatically delay the start of the event until the content file has been uploaded (or the product inventory has been delivered) and/or vetted (optionally including a buffer period). In particular, an auto-delay function of the product release platform 99 is able to monitor upcoming events (e.g. dates of prepurchase events, preorder prepurchase events as described below, general release events) and automatically delay the launch of those events if the content file has not been received (or the inventory and fulfillment readiness status for the product is unsatisfactory) and/or product listing has not been vetted before the start date of the events (e.g. including a predetermined buffer). In some embodiments, the auto-delay function is able to implement additional requirements that must be satisfied to prevent the auto-delay of the event.

The content file is able to comprise one or more of ebooks, computer software, downloadable applications, video games, audio, video, images (e.g. photographs, artwork), fonts, online courses, research reports, virtual goods and currencies used within virtual economies (e.g. within games), templates, and/or other types of digitally deliverable and/or accessible products. Additionally, the listing generation module is able to receive and store the content file in a plurality of different file formats so that these various options support various customer device requirements or preferences (e.g. in the case with ebooks, mobi, epub and PDF; with images, jpg, png, tiff; and with audio, MP3 and Way).

In performing the listing generation, the listing generation module is able to create a page (e.g. a webpage having a unique uniform resource locator (URL) and/or a page/screen in an application) operated by the product release platform 99 and dedicated to the product (e.g. describing the product and its availability date) and/or add the product to a product catalog of the platform (such that it is able to be found by customers searching the catalog, pre-ordered and/or purchased via an associated prepurchase event or a general release if the conditions are met). Alternatively or in addition, the module is able to automatically format and transmit the product data from one third party server 112 to one or more other third party servers 112 as a structured data feed (e.g. electronic data interchange (EDI) or other electronic delivery or upload method) such that the receiving third party servers 112 are able to generate one or more product listings. In some embodiments, the structured data feed comprises a prepurchase event activation date and time (if one has been created as described below), a reference to the location of the inventory (or when the inventory will be delivered) and status, and the ability to update all this information via future EDI update feeds as things change (like if a product controller updates their product description, changes prepurchase event access or end conditions, experiences production delays, or delays or cancels a product release event). As a result, the listing module provides the benefit of enabling third party servers 112 to use the product data to create and update standalone product listing pages, to add prepurchase event information to existing product listing pages, and/or to merchandise the availability of these prepurchase events elsewhere in their online stores so they can point customers to the prepurchase event's listing page(s).

The Vetting Module

The vetting module enables product release platform operators to ensure that prepurchase events, prepurchase preorder events and product listings are complete, accurate, and in compliance with policies (e.g. distributor or merchant policies entered into the system), or in compliance with applicable laws governing the sale or distribution of such products. Specifically, as the product controller (e.g. via a product controller device 104) is interfacing with the listing generation module to create or modify a listing as described above, the vetting module is able to dynamically provide real time, on-screen alerts if it detects that the entered information is incomplete (e.g. a product description that's too short to meet stored requirements; or a required data field that's not completed), disallowed (e.g. a product description that's too long; words, phrases, keywords, hyperlinks, personally identifiable information, categories or content that violate policies or applicable laws), or inaccurate. In doing so, the vetting module is able to automatically or partially automatically check submitted product data to determine if the data meets the requirements of generating a complete listing, a prepurchase event, and/or a prepurchase preorder event for the product.

Alternatively or in addition, the vetting module is able to enable the subsequent review of listings. In particular, the vetting module is able to generate a page for human confirmation and/or automatically check if the product data does not violate listing requirements (e.g. requirements of the product release server 102 and/or a third party server 112). In some embodiments, the vetting module consolidates reviewable listing elements of one or more product listings within a single graphical user interface to allow multiple prepurchase events to be reviewed at once. Additionally, if it is confirmed that an issue would prevent or delay the activation of the event, whether due to error, omission or policy violation, the module is able to (or enables an operator to) flag the listing as requiring modification, enter helpful written guidance to assist the product controller in repairing the issue, and then convey that guidance to the product controller automatically via one or more communications methods including email, on-screen alerts, voice messaging and/or text message.

In some embodiments the product release platform 99 will not allow an improperly categorized product listing to be published. For example, the product release platform 99 would prevent a children's ebook from being stocked, categorized and sold as a children's book if it in fact contains adult themes not suitable for children; or if the metadata is improperly formed, like an incomplete or inadequate product description; or a merchandising image doesn't meet acceptable standards for such a book; or if the content is completely disallowed from being sold (like certain taboo erotica, underage erotica, or illegal bomb-making instruction manuals). In some embodiments, on the product controller's dashboard, the vetting module automatically highlights product listings that have been blocked for publication or distribution such that the product controllers are able to edit, repair or delete the listings as desired. Alternatively, in some embodiments the vetting module is able to be omitted.

The Prepurchase Event Module

The prepurchase event module enables an account (e.g. product controller associated with the account) to generate any number of prepurchase events for a product listing on the product release platform 99. Specifically, the module enables the product controller to generate a new product listing or identify an existing product listing from the listings associated with the account (adding missing product data if necessary to complete the listing) and input prepurchase data to create a customized prepurchase event (for the listing/product) where a customer is able to purchase the product before its general release date. The prepurchase data is able to include one or more of an event start time, event duration data, pricing data, permission data (e.g. rules defining how the event is accessed) and/or one or more prepurchase conditions. This prepurchase data is able to be stored in a prepurchase event database for reference by the product release platform 99 to facilitate the execution of the prepurchase event.

The duration is able to be a start date and/or time before the general release date and optionally an ending condition. For example, the ending condition is able to be an end date and/or time, a maximum quantity of units authorized for sale during the prepurchase event (e.g. for a limited prepurchase event), a maximum quantity of customers using a key for the event, a depletion of customer-fulfillable inventory (e.g. sold out or out of stock), the achievement of a sales goal, manual cancellation (e.g. by the account that controls the event) and/or other parameters upon which the end of the duration is able to be determined. Alternatively, the end condition is able to be the general release date by default. In some embodiments, for static dates the module enables the selection of the duration data via enabling selecting from a point-and-click clickable calendar; entering a free form text such as "9/23/2020;" selecting or entering a total number of days (e.g. a number of days from the start date) and/or via pull down menu options where the product controllers choose the [month], [day], [year] or even [exact time down to the minute]. Alternatively or in addition, the static date selection is able to be received via voice commands where the product controller is prompted to provide a date.

For a manual cancellation, the module enables the account controlling the event to manually input an "event termination" command that ends the prepurchase event at any time for any reason. In some embodiments, the module enables the account to modify the end condition during the event. Alternatively, the module is able to prevent changes to one or more characteristics of the event (e.g. including the ending condition) once the event has begun. In some embodiments, to assist product controllers, the prepurchase event module is operative to display start and end dates/times in multiple time zones. Alternatively or in addition, the prepurchase event module enables the product controller/account to configure their prepurchase event listing to activate and/or terminate at different times and/or time zones or markets (e.g. multiple start dates/times and/or end conditions).

The pricing data is able to be static or dynamic. If the pricing data is a static price, the price will not change unless the account that owns the event manually changes it during the event. If the pricing data is a dynamic price it is able to change during the event based on one or more factors. Specifically, the pricing data is able to be a price metric that indicates how the price changes based on the one or more factors such as time (e.g. current date, a specific data after the start date but before the end date/condition, time left in the prepurchase event, time since last sale of the product within the event), current quantity of units of the product sold during the event, current amount of income generated from the event and/or current quantity of transactions or customers during the event.

For example, the prepurchase event module is able to incrementally increase or decrease the price based on one or a combination of the factors indicated by the price metric (e.g. the number of days since the event began or the number of days until the general release: price=$20+$1 for each day since the event began; or the number of units remaining: price=$20+$30*((the initial number of units—the number of units remaining)/the initial number of units). Alternatively, the pricing data is able to be a fixed price (e.g. $5; $0, etc.); auction pricing; subscription pricing; customer-sets-their-price; renting; down payment deposits; and/or installment payments. Additionally, the price determined by the pricing data is able to be dynamically adjusted by one or more prepurchase conditions as described below. For example, a variable percentage discount is able to be applied to the price as determined by the pricing data if one or more conditions are met by the customer. For example, as described below, in some embodiments if the customer agrees to share their contact information with the product controller/account, or join a private mailing list, or take some other action, the customer may receive a predetermined discount on the prepurchase (as indicated in the pricing data).

The one or more prepurchase conditions are able to be one or more actions that a customer must/may perform in order to prepurchase the product, adjust the price of the product and/or receive other benefits from the product release platform 99. In particular, the prepurchase event module enables the product controller to condition a benefit on the customer actions such as, but not limited to: the customer affirmatively agreeing to a set of terms (e.g. selecting an agreement command), purchasing one or more other products, the transaction total meeting a price threshold, submission of a contact email (e.g. to be stored and associated with the account of the prepurchase event), agreeing to sign up for a mailing list, preordering one or more other products, subscription to a group (e.g. a Facebook group), subscription to a service, watching a video, reading a text, completing a set of questions (e.g. a test or poll), promoting a message on social media, donating to charity, submission of desired contact data (e.g. telephone number, mailing address), completing a survey, agreement to a terms of use statement (e.g. agreeing to an anti-piracy promise prior to prepurchasing a digital product, agreeing to a confidentially pledge, or the prospective customer asserting they are of an appropriate age or experience level to purchase and responsibly use the product or service, digitally signing a release form or acknowledgement form, or agreeing to use the product in a responsible or safe or legal or recommended manner, or the prospective customer agreeing to hold the product controller harmless), agreeing to leave a review of the product and/or other actions/submissions/agreements. For example, the product controller is able to use the prepurchase event module to specify that in order to purchase the product of the prepurchase event the customer must have preordered the product (e.g. for the prepurchase event and/or for the general release date). Possible benefits are able to include one or more of the ability to: gain access to view the prepurchase event, purchase the product during the prepurchase event, gain access to one or more future prepurchase events, receive a discount on the product price, gain membership to a subscriber email list, other types benefits and/or a combination thereof. Thus, the condition data of the prepurchase event module provides the benefit of allowing the product controller greater flexibility to configure their prepurchase event access and promotion to achieve maximum business benefit or some other non-business goal of importance to the product controller or product release platform operator.

The permission data is able to be identification of one or more prospective customers that are authorized to access the prepurchase event. For example, the prepurchase event module enables a product controller to specify that the prepurchase event is private and the module will generate one or more digital keys that are required during the event in order to access the prepurchase event page and/or to complete the purchase of the product via the page. Specifically, the module is able to generate, present and/or transmit the one or more digital keys to the product controller for copying and distribution (e.g. to prospective customers). Alternatively or in addition, as described below, the module is able to distribute the keys automatically to destinations or customers identified by the product controller. Thus, this private prepurchase event is visible only to those who have knowledge of the prepurchase event and who possess the necessary digital keys.

The digital keys are able to comprise one or more of: codes, tokens, hyperlinks, passwords, pass phrases, and/or authorized affinity relationship gateway identifiers, such as, making the prepurchase event available only to customers who have a relationship with a credit card company or affiliated business partner, or who are already a subscriber to a private mailing list or fan club to access the prepurchase event. The private prepurchase event is able to be transacted over a private "landing page" (e.g. landing page, webpage, application screen/page, graphical user interface) that is able to look different from the publicly visible product listing page (e.g. that describes the general release date), or may be available via a different hyperlink or network accessible location (e.g. URL or specific screen within an application) than the publicly visible product listing page. The private prepurchase event landing page is able to primarily focus on closing the sale and routing the prospective customer to the purchase action or shopping cart. In some embodiments, for a private prepurchase event implemented on the product release server 102 and/or a third party server's 112 (e.g. online merchant) product listing page, the private prepurchase event is able to be "unlocked" by the use of a cookie (as the key) deposited by the prepurchase event module in the prospective customer's web browser when they clicked on a hyperlink (generated by the prepurchase event module) such that the now "cookied" browser unlocks access to the private prepurchase event from the main product listing page, and/or reroutes the customer to the prepurchase event page or listing (as described below); or the product listing page is able to present an option for a customer to manually enter a prepurchase event key; or when the customer performed some other activity prior to unlocking the prepurchase event.

The type of digital keys generated by the prepurchase event generation module for private prepurchase events is able to be selected for each event. In particular, the module enables one or more different key types to be selected from the group comprising: a random code, a password, a pass phrase, a captcha, a hyperlink including an embedded unique code, an unknown hyperlink URL, a token, web browser cookie and/or other types of digital keys. In some embodiments, the digital keys are able to be one-time use codes either manually input or embedded in a hyperlink or cookie so that each key (e.g. one-time use code) is only able to be used once to access the prepurchase event, and after successful purchase the relevant key would expire, thereby rendering the key (and hyperlinks embedding it) unusable to future customers. This would have the benefit of preventing customers from sharing their private access credentials with friends or on social media if such sharing is not desired by the product controller. In some embodiments, the prepurchase event module is able to enable the product controller to access existing customer contact information (associated with the product controller's account) previously captured or stored within the product release server 102, and/or upload new customer contact information via a uploaded file (e.g. format such as xls, txt, comma delimited, tab delimited) and/or predetermined EDI method, or manually enter an unlimited number of customer email addresses. The product release platform 99 is able to use this data to generate the same number of keys (e.g. unique codes) tied to the contact information of each prospective customer, and these keys are able to be shared by the product controller to each prospective customer. As described above, these keys (e.g. codes and code-embedded hyperlinks) are able to be made to be one-time-use only, limited use, or could be unlimited use for instances where the product controller wants to encourage or incentivize prospective customers to share the keys in exchange for goodwill, gifts, rewards, affiliate sales earnings, or other recognition.

For example, the prepurchase event module is able to generate a hyperlink that combines both a digital product identifier and an access code (e.g. https://musicprepurchase-platform.com/942864/EWRP9K). Specifically, the hyperlink is able to include a randomly generated code (e.g. beginning with "EWR" or any other alphanumeric characters) and where "942864" is able to be any alphanumeric characters corresponding to one or more product identifiers (ID) attached to this product by the product release platform 99. Thus, the hyperlink is able to use the product identifier within the link to navigate to the desired prepurchase event and then automatically submit the code to the prepurchase event module in order to allow the customer device 106 to gain access to the event page and/or to gain access to the purchase function of the page. Alternatively or in addition, the product identifier and an access token are able to be combined into a single alphanumeric passcode that the prospective customer can manually enter into the platform 99 to gain access to the prepurchase event.

In addition, for generated keys linked to the identity of a customer, from either the combined event code, product identifier or any key, the product release platform 99 is able to identify the account that created the prepurchase event and/or the identity of a customer as participating in an affiliate program for which either or both parties (customer and/or product controller) are incentivized to share this unique code with other prospective customers, even in the event of a private prepurchase event, for the purpose of incentivizing the customer to share the code or link within their social or marketing circles.

In some embodiments, the prepurchase event module is able to generate for the product controller keys in the form of multiple (or an unlimited number of) one-time-use codes or tokens, or metered codes or tokens (e.g. authorizing a limited number of redemptions for each individual code before it expires) so that each code is able to be used to access the prepurchase event a predetermined number of times as selected by the prepurchase event owner. Specifically, after successful purchase of the product using the relevant code or token, and/or after the code or token has reached its allowable number of redemptions, the token is marked as "expired" and therefore invalid by the platform such that it cannot be used again. This prevents customers from sharing their private access codes with friends or on social media in instances where the prepurchase event owner desires to limit access to the event.

In some embodiments, similar to above, the prepurchase event generation module is able to enable the product controller to select, upload or enter customer contact information (e.g. email addresses or phone numbers for texting) and the product release platform 99 is able to use this data to automatically generate on demand, on a self-serve basis, the same number of unique codes attached to each customer contact information (and/or contact method), and then dispense these codes to the product controller who would manage their disbursement. In other words, the module is able to generate a code document including the desired number of code (and/or hyperlinks) that the product controller is able to download or copy in order to distribute as desired. Similar to above, these codes could be made to be one-time-use only, or metered (as described above) or could be unlimited use for instances where the product controller wants to encourage and incentivize customers to share the code, possibly in exchange for goodwill, gifts, rewards, affiliate sales earnings, or other recognition. In any case, by tracking the redemption and authentication of the keys, the product release platform 99 is able to track and report sales and/or key use back to the product controller (e.g. via the analytics module described below).

In some embodiments, the prepurchase event generation module further includes an advertisement and/or key distribution function that transmits information about the prepurchase event and/or the key(s) for the event to one or more selected customers. Specifically, during or after the prepurchase event generation process, the prepurchase event module enables the prepurchase event creator to select the contact information of one or more customers from a list of customer contact information (e.g. email addresses, telephone numbers or other) associated with the product controller's account profile on the product release server 99, wherein the prepurchase event module is able to then automatically send an advertisement and/or key(s) for the event to the selected customers at the indicated contact points (identified by the contact information). For example, the module is able to generate and transmit via email, text or online screen messaging a link to the prepurchase event to the selected customers. In particular, in some embodiments the link is able to include the key for accessing/purchasing the product during the prepurchase event. Alternatively, the prepurchase event creator is able to download or otherwise use the contact information to personally contact the customers as desired.

As another example, this message is able to be directed to customers of the product release server 102 and/or a third party server 112 (e.g. an online merchant) that previously purchased products or services from the prepurchase event owner, and/or customers of the product release server 102 and/or a third party server 112 that have purchased, viewed or expressed interest in products similar to those of the prepurchase event owner. In the case of a third party server 112, the contact information is able to be transmitted from the third party server 112 to the product release server 102. The method of alerting customers about the prepurchase event is able to comprise one or more of an email alert, a text alert, an audio alert, a web page, a smart speaker device, visual promotion of the prepurchase event or the product participating in the prepurchase event within the product release server 102 and/or a third party server 112 customer-facing merchandising features (e.g. if the prepurchase event relates to a new hiking boot from brand A, and a prospective customer of the product release server 102 and/or a third party server 112 catalog previously purchased a hiking boot from brand B, and/or the customer is browsing the hiking boot category, and/or the prospective customer is using search terms related to the topic of hiking or hiking boots or other similar outdoor activities, then the product release server 102 and/or a third party server 112 can display or advertise the availability of a prepurchase event to that specific customer). An additional related embodiment includes the product release server 102 and/or a third party server 112 advertising a plurality of products currently available to customers as a prepurchase. An additional related embodiment includes the product release server 102 and/or a third party server 112 offering paid advertising opportunities to the product controller that created the prepurchase event, in which the advertising would be able to be displayed via one or more of the following targeting options: prior customers of the product controller, customers of similar brands or products, customers that fit certain education, geographic, age, gender, income level, political orientation of other demographically targetable characteristics known by the product release server 102 and/or a third party server 112 about their customers, customers searching on specific search terms or browsing other products either similar to or complementary to the product controller's product, or a general audience.

Additionally, as described below with respect to the dashboard module, the product release platform 99 also enables product controllers who created the prepurchase event to download, add, delete and edit the customer contact information associated with their accounts.

Alternatively, in some embodiments the seller is able to specify that the prepurchase event or the prepurchase pre-order event (as described below) is public such that generation of keys is unnecessary. In some embodiments, the prepurchase event module enables the product controller who created a prepurchase event to change the event from private to public or from public to private at any time during the event.

If the product controller indicates in the permission data that the prepurchase event is to be public, the module is able to omit the generation and/or transmission of the keys. Although a public prepurchase event is able to be visible to all customers of the product release server 102 and/or a third party server 112, it's still possible that the public prepurchase event is only exclusively available at the product release server 102 and/or a third party server 112, or a limited plurality of the product release server 102 and/or third party servers 112, or available for only a limited time at the product release server 102 and/or a third party servers 112, or available on a prepurchase event page that is only visible to those who know the URL. A public prepurchase event, when merchandised at the product release server 102 and/or a third party server 112, is able to be accompanied by the presentation of two or more event dates (the public release date and one or more public prepurchase event dates). Specifically, at the product release server 102 and/or a third party server's 112, both or neither of the release date events may appear on the prepurchase event page and/or the product listing page (e.g. the product release server 102 and/or a third party server 112 may simply decide to omit references to dates, and instead present the prepurchase event as a prepurchase event page where product availability is presented as "available now," or words to that effect, and/or there may be no other indicator that the product is available now other than presence of a purchase button). The prepurchase event page is able to be designed to merchandise the prepurchase event and direct the consumer into the shopping cart facility. Alternatively, the public prepurchase event is able to be merchandised directly on the product listing page of the product in the product release server 102 and/or a third party server's 112 catalog.

In some embodiments as described above, during or after the prepurchase event creation process, the vetting module is able to check the values submitted by the user to ensure they meet the requirements of creating a prepurchase event. For example, the module is able to flag or reject submitted information that is erroneous or unacceptable (e.g. a prepurchase start time/duration must be earlier than a general release date of the product; price must be greater than or equal to zero) or an associated product listing that is not complete (e.g. the content file has not yet been uploaded and/or vetted; or physical product inventory status is insufficient to enable customer deliveries). In other words, the module is able to either automatically prevent generation of the prepurchase event at all and/or able to prevent or delay activation of the prepurchase event if the event has errors that have not been corrected before the event start date (and/or a predetermined buffer time). Prepurchase events, prior to enabling customer purchases, generally require that the product controller has delivered the necessary product inventory to the product release server 102 and/or a third party server 112 so that the product can be fulfilled (delivered) to the customer who orders the product following the start of the prepurchase event. This product inventory comes in the form of a digital content file in the case of digital products, or physical inventory. This status information for digital and physical products is tracked by the Inventory Module.

In some embodiments, the prepurchase event module is able to check an inventory status for the product and either automatically prevent generation of the prepurchase event at all and/or prevent/delay execution of the prepurchase event if the inventory status does not meet a required criteria. For example, to ensure the prepurchase event is ready for activation and product fulfillment, the listing generation module is able to track inventory levels and locations of ready-to-ship product within customer fulfillment centers (e.g. warehousing facilities, distribution centers, physical pickup locations), track Advance Shipment Notifications (ASNs), and reflect generalized inventory status (e.g. if the product is currently available for customer delivery or not, and if so, knowledge of what quantities) on the prepurchase event listing pages.

In some embodiments, where the prepurchase event module enables the event to be generated even with errors or without a content file, the prepurchase event module is able to email a product controller or flag submitted prepurchase events on the product controller's (that created the event) dashboard to notify them of errors that need to be corrected in order to prevent the event from being automatically delayed and/or canceled. Additionally, using the dashboard module described below, the product controller is able to modify details of their prepurchase event, such as the ability to complete missing elements, or edit, delete, or otherwise modify prepurchase events.

Finally, once all of the required data is received by the prepurchase event generation module, the module is able to generate a prepurchase event listing or page that enables a customer to purchase the product before the general release date if they meet the required conditions and/or possess the required key for the prepurchase event (if a key is required). In some embodiments, the prepurchase event page cannot be found/navigated to without the hyperlink generated by the prepurchase event module for the event. Alternatively, the page can be navigated to by a prospective customer, but the purchase feature cannot be used without submission of the required key for the event (if any). In some embodiments, the prepurchase event page is linked to by the product listing page of the associated product. In some embodiments, the event page comprises one or more of a countdown clock (indicating how long until the event ends), a plurality of release dates (e.g. including the prepurchase event duration and the general release date) and/or pricing data (e.g. a static price associated with each release date; a current dynamic price; and/or a pricing metric for the prepurchase event). For example, as shown in FIG. 3 the prepurchase page is able to display a general release time and/or date and one or more prepurchase event times and/or dates (e.g. along with a countdown clock) and other data about the product and the details of those events (e.g. duration, price, conditions). This dynamic countdown clock captures the time-limited opportunity and urgency for the prospective customer to take advantage of the early prepurchase event. As described herein, "page" is able to refer to a webpage, a website, some or all of a program or application or other network accessible location.

As a result, the prepurchase event module provides the benefit of enabling a product controller to customize a prepurchase event and thereby exercise greater control over the sales and marketing of their product. Further, the option to create a plurality of prepurchase events opens up new marketing opportunities for product controllers. For example, the product controller may desire to create three separate prepurchase events, each running simultaneously or separated by some number of days so that they are able to run targeted prepurchase marketing campaigns to different customer segments. For the earliest prepurchase event, the price might be higher or lower (or the same), or the product controller may want to limit (meter) the number of people allowed to access that earliest prepurchase event, or they may want to offer the earliest prepurchase event only to a subset of selected customers, such as to subscribers to their private customer mailing list, or to members of a loyalty reward club. A plurality of prepurchase events opens up myriad permutations for product controllers to build customer excitement, reward customer loyalty, target unique customer segments with different marketing messages or campaigns, perform AB testing of various marketing messaging or tactics, and to encourage customer behaviors that are advantageous to the product controller (such as prepurchase event conditions of purchasing other products to unlock the prepurchase event; agreeing to specific Terms of Use statements; or performing other tasks such as signing up for a newsletter, sharing something on social media, or other tasks as a condition to unlocking the prepurchase event).

The Prepurchase Preorder Module

The prepurchase preorder module enables product controllers to generate a prepurchase preorder event for a prepurchase event of a product listing. As a result, the prepurchase preorder module enables customers to place a reservation for a product of an upcoming prepurchase event so that at the time that the prepurchase event begins to accept customer orders, the customer's prepurchase preorder is automatically executed and the product fulfillment process is initiated. The benefit for product controllers is that they can begin marketing their prepurchase event weeks or months in advance, and the benefit for customers is that they can reserve the opportunity to purchase and receive an upcoming new product before the general public, rather than waiting for the start date of prepurchase event before they can place their order.

To generate a prepurchase preorder event, the prepurchase preorder module enables an account (e.g. product controller) to identify an existing prepurchase event and submit a date and/or duration of when the prepurchase preorder event should begin (and end) and the module is able to automatically generate a prepurchase preorder page (e.g. webpage, application page, preorder functionality on another page) for the prepurchase preorder event. The prepurchase preorder page is able to indicate the product (similar to the product listing page and/or prepurchase event page) and/or provide the ability to preorder the product for the prepurchase event. In some embodiments, one or more of the listing page, prepurchase event page and/or prepurchase preorder event page are able to be combined. Further, the prepurchase event and/or prepurchase preorder event information is able to be added to the platform catalog (e.g. for customer merchandising).

In some embodiments, like the product listings described above, the module enables the generation of the prepurchase preorder event before the prepurchase event has been finalized (e.g. before all of the requirements described above for the prepurchase event have been satisfied). In other words, the module allows product controllers to create and launch prepurchase preorder events (i.e. begin accepting customer preorder reservations) before the customer-fulfillable product inventory is received by the product release server 102 and/or a third party server 112, since such product inventory isn't due to the product release server 102 and/or a third party server 112 until some time period (defined by the product release server 102 and/or a third party server 112) in advance of the prepurchase event start date. The prepurchase event start date is the date at which the product release server 102 and/or a third party server 112 generally accepts customer payment and is obligated to initiate customer delivery of the preordered product.

In such embodiments, the prepurchase event module is able to require the product controller creating a prepurchase preorder event of an incomplete prepurchase event to affirmatively agree to complete the prepurchase event (e.g. meet the requirements of the prepurchase event module described above) before the specified deadline. In such embodiments, the preorder prepurchase module is able to automatically send reminder messages (e.g. text messages, popup messages, telephonic messages, emails, selectable on-screen acknowledgment boxes, and/or other type of messages) to the product controller/account that created the prepurchase preorder event indicating that the prepurchase event is not complete and/or needs to be complete by the deadline. In such embodiments, the prepurchase preorder module is able to begin accepting customer preorders (if the start time of the prepurchase preorder event is reached) despite the prepurchase event not being finalized. Also in such embodiments, the prepurchase preorder event is able to be automatically cancelled, extended or delayed by the module if the associated prepurchase event is canceled, extended or delayed (e.g. by not completing the prepurchase event generation/activation as described above before a specified deadline). Alternatively, the prepurchase preorder event is only able to be generated after the prepurchase event has been finalized. Additionally, like the prepurchase event generation module and vetting module described above, the prepurchase preorder event module is able to dynamically or otherwise flag submitted errors and is able to notify the product controller that the errors need to be corrected before the event is able to be generated.

Once the prepurchase preorder event has been generated, the prepurchase preorder module enables customers to select one or more product/product listings that have upcoming prepurchase events, and preorder those products for those events using the prepurchase preorder event. For example, the module is able to add a prepurchase preorder function to the listing for the product (e.g. within the product catalog) and/or to the prepurchase event page for the product and/or provide access to the prepurchase preorder page for the product. Specifically, the customer is able to submit their (future or current) payment and delivery information (if not already captured by the platform 99) along with the selected products and the prepurchase preorder module will generate a prepurchase preorder reservation that is stored and associated with the customer's account. As a result, when the prepurchase event begins (i.e. the product is able to be prepurchased) the prepurchase preorder module is able to automatically (or upon confirmation from the customer) complete the purchase transaction and initiate delivery of the product to the customer. Additionally, in some embodiments if the prepurchase event requires submission of a key (e.g. the prepurchase event is private), the prepurchase preorder module is able to require submission and verification of the key (in the same manner as described above with the prepurchase event generation module) before the customer is permitted to create the prepurchase preorder reservation.

As a result, the product release system 100 provides the advantage of enabling product controllers to create one or more customized preorder events for each of the prepurchase events in order to further enhance the control they have over the marketing and distribution of their new product introductions. With a preorder of a product of a prepurchase event, a customer can view a product listing for an upcoming prepurchase event, and preorder the product of said prepurchase event, and their payment information is able to not be charged until the product is released to them on the special prepurchase event start date, which means the customer fulfillment date is earlier than the general release date.

The Dashboard Module

The dashboard module enables product controllers to access the product listings, prepurchase events, preorder prepurchase events, customer data and other data associated with their account in order to view (e.g. preview as they are to be displayed), edit, modify, correct, complete, delete, reactivate and/or add to them. For example, the product controllers of are able to access their account's listings, prepurchase events and/or prepurchase preorder events associated with that account that are active, pending approval, expired, and/or in draft form. As described above, the dashboard is able to provide flags or other types of notifications to alert product controllers of incomplete or incorrectly submitted listings and/or events, forthcoming product delivery deadlines (e.g. for prepurchase events and/or prepurchase preorder events), as well as enable the product controllers to correct and/or complete those pending items.

For example, a product controller is able to use the dashboard module to navigate to a prepurchase event's configuration data to change the time, price or any of the other characteristics of the event (described above), or to check inventory status. These tools enable the product controller to modify many aspects of their prepurchase event, such as prepurchase event date, product description, rules for access (conditions), rules for discounts (e.g. coupons and conditional offers) or to create multiple prepurchase events (e.g. subject to the rules set by an online merchant, distributor or other entity). Additionally, the dashboard module is able to display active and expired events, the status of each, performance metrics related to each, and other data in addition to enabling their modification. Similarly, in some embodiments the dashboard module is able to display and/or enable the download of the customer contact data and/or other data associated with the account such that a product controller is able to use the data to directly contact their customers or fans. Alternatively or in addition, the module enables a seller to export customer contact information in one or more structured formats so that this data may be easily integrated with third party email marketing tools and/or customer relationship management systems (e.g. over the network 108).

The ability for a product controller, on a self-serve basis, to directly edit how their product listing will appear in the product release server 102 and/or a third party server's 112 catalog—and be made viewable by prospective customers—provides for the scalable enablement of the thousands of new product introductions which product controllers will desire to list as prepurchase events and prepurchase preorder events. With a flood of dynamic, ever-changing product listings it is otherwise physically, economically and practically unfeasible for an online merchant to manage this data entry without the self-serve assistance of the product controller, and this facility is enabled by providing product controllers access to the dashboard module offering these self-serve tools.

The Purchase Module

The purchase module enables a customer to select a product or service from the product release platform 99 (e.g. via the catalog listings and/or a prepurchase event page), submit payment information (if not already known), and payment authorization. The purchase module processes the transaction (e.g. via a payment processor), records the transaction in the databases for the accounts of both the customer and the product controller and initiates delivery of the product to the customer (e.g. makes the product deliverable to, or downloadable by, or accessible to, the customer's device 106, to the user's account/library on the product release platform 99 for future access, and/or to another network accessible location; initiates shipment of the product to customers). If the product is being purchased via a private prepurchase event (or preorder thereof), the module is able to verify that the customer has presented a key for the event that matches one of the valid keys associated with the event, and if not prevent the preorder or sale of the product. In some embodiments, each time a customer purchases a product via a prepurchase event or reserves the product as part of a prepurchase preorder event, the module transmits the customer an automated confirmation message (e.g. text message, telephone message, email, message via a smart speaker device) with access information and/or delivery information for their product, and such information may include hyperlinks to product listing pages.

In one embodiment, for the product release server 102 and/or a third party server 112 operating subscription services, where customers pay a subscription fee to access a large catalog of content, the module is able to release products to subscribers of a particular subscription service before the product's general release date, wherein the product is able to be included at no extra cost to the subscriber as part their subscription (e.g. a new ebook released early to subscribers of an ebook subscription service, or a new music album released early to subscribers of a particular streaming music service). In other words, just as the prepurchase module allows customers to purchase and receive a product before the general public release date, the prepurchase module also enables product controllers to utilize subscription services to make products accessible to their subscribers earlier than the general release date. Alternatively or in addition, the subscription service could charge subscribers an additional fee as the condition for accessing such content earlier than the general public.

In some embodiments, the module enables product controllers to configure custom "thank you" messages, utilizing one or more the customer's preferred contact methods, which are able to be inserted into the purchase confirmations transmitted by the purchase module. In these embodiments, these purchase confirmations are able to also include advertisements for related products from this or other product controllers, or contain gifts, incentives or digital coupons. Such personalized and customizable messages enable the product controller to communicate directly with the customer, even in situations where the customer identity and customer contact information is unknown to the product controller.

The Analytics Module

Figure 4:
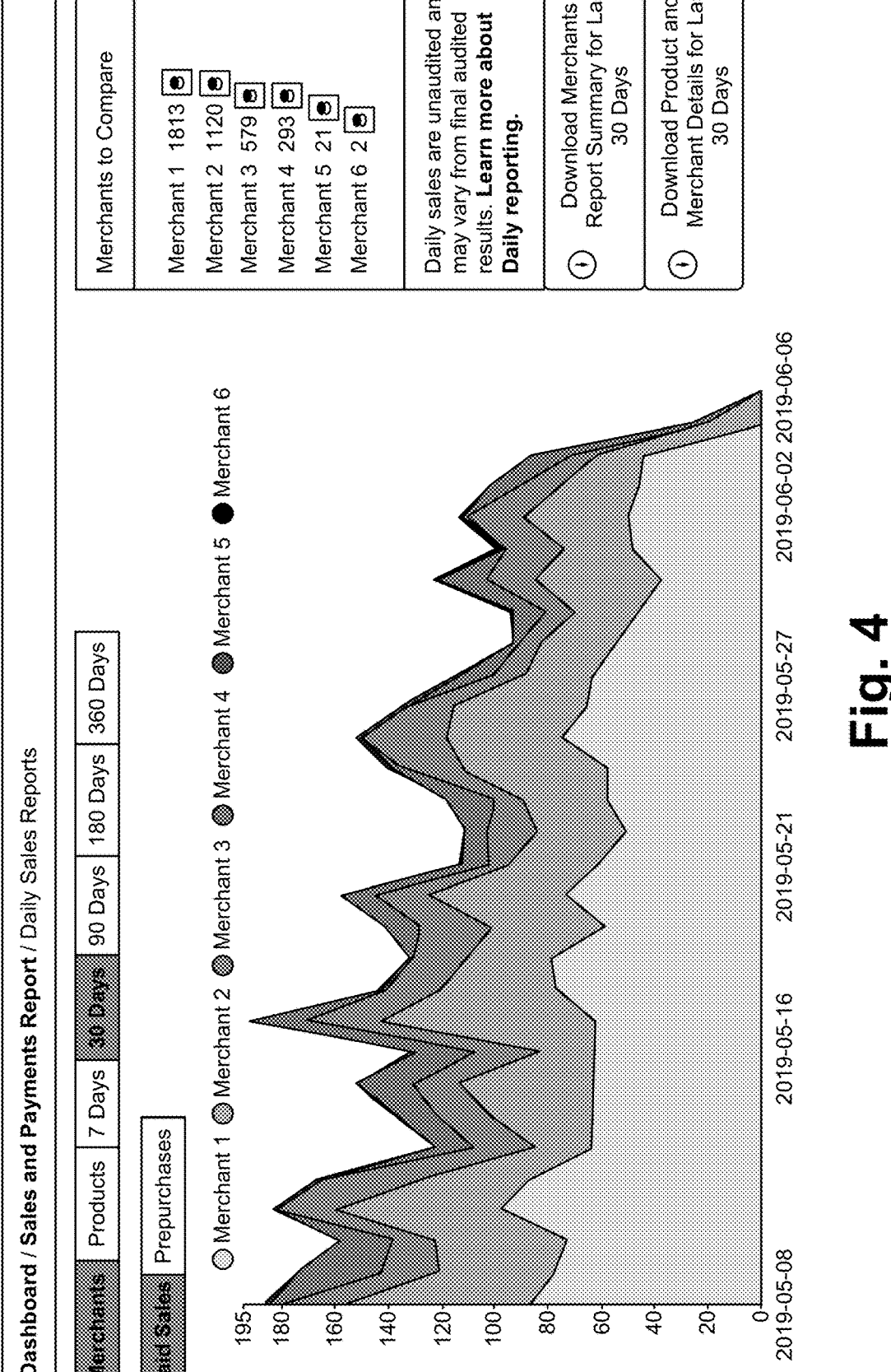
FIG. 4 illustrates an analytics page according to some embodiments.

The analytics module enables a product controller to access account data (e.g. customer data, event data, sales data, product data, time-series data) and download or otherwise manipulate the data for identifying trends, correcting mistakes and/or using the data to improve their product sales and marketing. Further, in some embodiments the analytics module is able to transmit alerts to the product controller, via a communications method selected by the product controller (e.g. email and/or text and/or voice and/or on-screen messages) each time they make a sale of their product, or on some predetermined frequency, and/or provide via a graphical user interface visual "Daily Sales" charts where product controllers are able to view their recent sales data in graphical time-series form. Such daily sales charts are able to aggregate prepurchase sales data and prepurchase preorder reservations from across multiple sales outlets as shown in FIG. 4, and/or integrate this data into existing sales reports for other products not on prepurchase or prepurchase preorder.

The Coupon Module

The coupon module is able to enable product controllers to generate custom coupons that are able to be applied by the purchase module when a customer uses the coupons to purchase or reserve the products associated with the coupons. In some embodiments, the purchase module is able to validate a coupon code entered directly into a digital shopping cart prior to consummating the purchase. This coupon code is able to be separate from a prepurchase event key as well as any other incentives attached to the prepurchase event key. In some embodiments, generated coupons are able to comprise a fixed price coupon, wherein the module enables the sellers to configure, on a self-serve basis, custom coupon codes that set a specific price or discount level, or any percentage-off level. In some embodiments, these coupons are able to be configured to expire at a future date, including dates that may precede the end of the prepurchase or prepurchase preorder event. In this way, a seller is able to advertise their prepurchase, or their prepurchase preorder, with words to effect of, "25% off the regular price, available exclusively to prepurchase customers, good for the next three days only." In some embodiments, the generated coupons are able to comprise a metered (i.e. limited redemption) coupon wherein the coupon module is able to generate a coupon code that will automatically expire after a predetermined number of redemptions as determined by the product controller. In such embodiments involving a metered prepurchase event, a product controller is able to advertise words to the effect of, "The exclusive prepurchase event is available only to the first 15,000 fans, after which the prepurchase event expires and you'll need to wait until the general release in two weeks to purchase the product." Additionally, the metered coupon is able to be combined with the fixed price coupon to create myriad useful promotional permutations that the product controller is able to use concurrently, or in combination, or in sequence in advance of the general release date.

In some embodiments, the generated coupons are able to comprise product family coupons, wherein if the seller produces multiple products, the module is able to generate a single coupon code that customers are able to apply to any one or plurality of products that are sold by the product controller at the product release server 102 and/or a third party server 112. In some embodiments, the coupons are able to comprise one-time use coupons wherein the coupon module would enable product controllers, on a self-serve basis, to request one or more one-time use coupons that the product controller is able to then use in their marketing promotions. Such coupons are useful for sellers who want to print them on scratch-off cards, print them on business cards or marketing literature, or dole them out selectively to customers or marketing partners. In some embodiments, generated one-time-use coupons are able to be attached to the identity of the individual customer or customer group, useable by only said authorized customer or customer group.

In some embodiments, the coupon module is able to integrate knowledge of one of the above coupon methods directly into the prepurchase event keys. In this way, using the keys (e.g. with a single click on a hyperlink, or by manually entering a passcode), the product release platform 99 is able to automatically recognize the identity of the customer, the product controller that created the prepurchase event, the customer's access credentials, and can automatically apply the coupon benefit without requiring the prospective customer to manually enter an additional coupon code beyond their key. Additionally, in the case of custom-generated hyperlinks tied to the customer's identity as described in the discussion of the prepurchase event module, the coupon module has the ability to make a network call to the coupon module to check for the presence of an applicable custom coupon code, and then with the prior consent of the product controller, generate custom hyperlinks that are automatically aware of the coupon code so that this information may be automatically recognized by the purchase module.

The Subscriber Module

The subscriber module is able to provide a subscriber function that customers are able to select and enter contact information (and/or select an existing account with associated contact information) and the product release system is operative to deliver messages and/or benefits to the customers that have subscribed (as stored in a subscriber database). In particular, each of the subscribers lists are able to be associated with a product controller (e.g. product controller account) and/or a product, type of product or related products (e.g. a particular ebook, ebooks generally or an ebooks series) and provided benefits associated with that creator and/or product, type of product or related products.

Additionally, as described above, the product release platform 99 is able to present existing subscription lists associated with a product controller account (and/or products thereof) for selection by the product controller (when creating an event) as target customers for that event. The product release platform 99 is then able to transmit keys for or otherwise make the event (e.g. prepurchase or prepurchase presale) available to those target customers (in one or more of the manners described above).

The Event Bid Module

The event bid module enables a product controller account to identify one or more events of the account as "bid events" and one or more other accounts (e.g. accounts of one or more online merchants) to bid for, or negotiate for, the right to list and host the prepurchase and prepurchase preorder events, either exclusively or non-exclusivity. Additionally, the event bid module is able to enable accounts (e.g. accounts of third party servers 112, online merchants and/or the distributors that supply online merchants) to upload a standardized menu of preferential terms that the module enables the product controller accounts to optionally accept for one or more products of that account. These terms are then able to be automatically applied based on characteristics of a prepurchase event. The characteristics are able to comprise one or more of: the type of product; track record or reputation of the product controller; length of the prepurchase event; the number of days for which the prepurchase event represents early access compared to the general release date; performance of the general release preorder, and or the level of exclusivity (none, partial, full); and the incentives offered to the product controller may comprise one or more of preferential merchandising, marketing and/or discoverability within the product release server 102 and/or a third party server's 112 catalog; targeted email marketing to the product release server 102 and/or a third party server's 112 customers; payment of an advance by the product release server 102 and/or a third party server 112 (e.g. merchant or distributor) to the product controller for the right to carry (list) and execute the prepurchase event; improved payment terms compared to an ordinary single public release event (e.g. to the creator or their representative, higher royalties or margins, lower commissions or fees, more favorable payment terms); the promise or consideration of featured promotion at the product release server 102 and/or a third party server 112 and/or inclusion in special merchandising features; or other advantages in exchange for the product controller agreeing to make their prepurchase event available to the product release server 102 and/or a third party server's 112 customers or subscribers. As a result, the module provides the advantage of enabling the product controller to enroll their product at favorable predetermined terms on a self-serve basis without requiring any person-to-person negotiation, thereby enabling the product release server 102 and/or a third party server 112 to source these valuable prepurchase event listings at scale.

The Inventory Module

The inventory module is able to monitor the customer-fulfillable inventory status. The inventory module is able to have application programming interface (API) hooks that allow it to access and display inventory data stored in inventory management systems. The inventory module is able to display inventory levels of customer-fulfillable product at any time during the product controller's creation of their prepurchase or prepurchase preorder event, and at any time leading up to or during the prepurchase or prepurchase preorder events, and if necessary prompt or remind the product controller to deliver product by the agreed-upon deadlines, per the custom terms specified to the product controller when the product controller was setting up their event. As the event activation or release dates approach, other modules of the product release platform 99, working in concert with the inventory module, are able to transmit messages to the inventory module to understand if the product controller has delivered the product; otherwise the prepurchase event is able to be automatically delayed or cancelled.

Method of Operation

FIG. 5 illustrates a method of enabling prepurchase of one or more products via one or more product release servers 102 according to some embodiments. As shown in FIG. 5, the product release platform 99 generates a product listing identifying a product based on product data received from a third party product controller device 104 at the step 502. In some embodiments, the product data includes a content file containing the product, a product release date, and metadata associated with the product and the content file. The product release platform 99 generates one or more prepurchase keys and one or more prepurchase events based on prepurchase data for the product input by the third party product controller device 104 at the step 504. Alternatively, the step 504 is able to be omitted for non-private events. In some embodiments, the prepurchase data includes a starting time, one or more end conditions and pricing data for each of the prepurchase events. In some embodiments, the prepurchase data includes a selection of one or more entries of customer contact data and the product release platform 99 automatically transmits the keys to the locations identified by the customer contact data. For each of the prepurchase events, the product release platform 99 facilitates the sales of the product to one or more customer devices 106 during the prepurchase event if one or more keys submitted by the customer devices 106 correspond to the prepurchase keys associated with the prepurchase event and preventing sales if they do not at the step 506. The product release platform 99 then delivers the product to the one or more customer devices 106 after the transaction is complete at the step 508.

In some embodiments, the method further comprises the product release platform 99 generating one or more prepurchase preorder keys and one or more prepurchase preorder events based on prepurchase preorder data (stored in a preorder database) for the product indicated by the customer device 106. In some embodiments, the prepurchase preorder data includes information that identifies one of the prepurchase events. In some embodiments, the method further comprises the product release platform 99, for each of the prepurchase preorder events, facilitating ordering of the product by one or more customer devices 106 during the prepurchase preorder event if one or more prepurchase preorder keys submitted by the customers correspond to the prepurchase preorder keys associated with the prepurchase preorder event and preventing ordering of the product by the customer devices 106 if not. In some embodiments, the method further comprises the product release platform 99 automatically facilitating the purchase of the product by the one or more customer devices 106 that ordered the product during the identified one of the prepurchase events.

In some embodiments, the method further comprises the product release platform 99 terminating the prepurchase event upon reaching the time indicated by the end condition. In some embodiments, the method further comprises the product release platform 99 dynamically adjusting the price indicated on the prepurchase event page based on a pricing metric of the pricing data. In some embodiments, the method further comprises the product release platform 99 preventing sales of the product to the consumer devices 106 even if the submitted key corresponds to the prepurchase keys associated with the prepurchase event if the one or more of the consumers have not satisfied the prepurchase conditions defined in the prepurchase data. In some embodiments, the method further comprises the product release platform 99 enabling the selection of all or a subset of customer contact information of the product controller's account and automatically transmitting the prepurchase key to network accessible locations identified by the subset of the one of the sets of customer contact information.

In some embodiments, the method further comprises the product release platform 99 collecting the contact information submitted to satisfy the prepurchase conditions and adding it to the sets of customer contact information of the account associated with the prepurchase event (e.g. the account of the product controller who created the prepurchase event). In some embodiments, the method further comprises the product release platform 99 generating a prepurchase page (e.g. webpage, application page) that identifies the product based on the metadata, the release date of the product and the starting time of the prepurchase event. As a result, the method provides the advantage of enabling product controllers to directly generate, modify and control customized prepurchase events for the sales of their products. Additionally, although the method of FIG. 5 includes steps 502-508, one or more of the steps are able to be omitted, rearranged and/or additional steps are able to be added including one or more of the features described herein.

Figure 6:
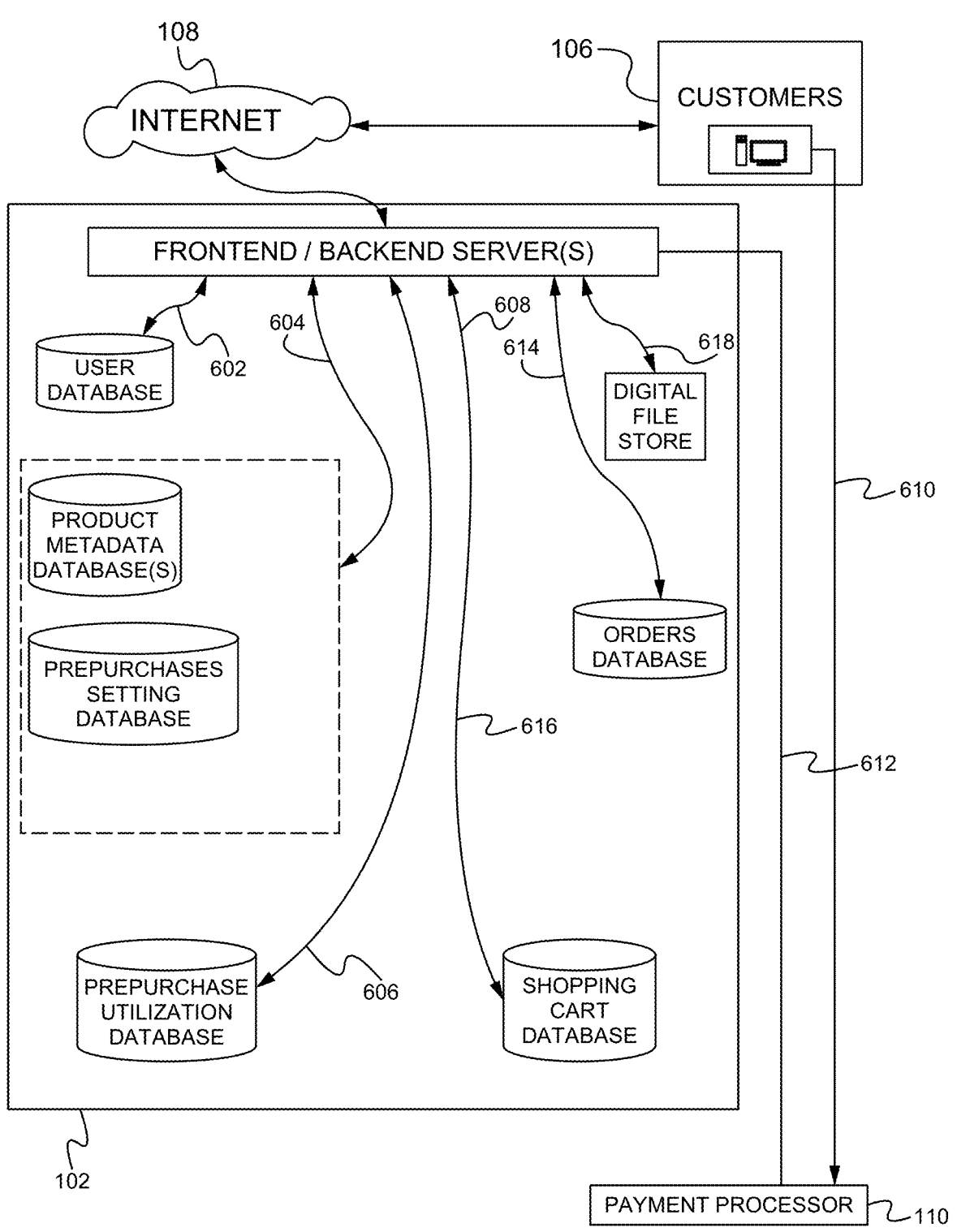
FIG. 6 illustrates a method of a customer device purchasing a product via a prepurchase event according to some embodiments.

FIG. 6 illustrates a method of a customer device 106 purchasing a product via a prepurchase event according to some embodiments. As shown in FIG. 6, the customer device 106 creates an account on the product release server 102 at the step 602. Alternatively, the customer device 106 is able to use a guest account in which the complete or partial account registration process is integrated into the shopping cart purchase process, or step 602 is able to be omitted if an account has been previously created. The customer device 106 accesses the prepurchase product on the product release server 102 at the step 604. In some embodiments, the price of the product on the prepurchase event page is dynamically adjusted by the server based on the pricing data of the prepurchase event. In some embodiments, the customer 106 accesses the prepurchase product by accessing a prepurchase event page, a product listing from a dedicated page or from a catalog of one or more products, and/or a hyperlink that links to the prepurchase event page. The product data and/or the prepurchase event data are able to be stored in one or more databases on the product release server 102. For private prepurchase events, the customer device 106 submits the key and the product release server 102 verifies that the key corresponds to one or more of the keys for that prepurchase event at the step 606.

Specifically, the product release server 102 is able to verify the key by determining that the key matches or corresponds to one of the keys for the prepurchase event stored in a prepurchase database, or, in the case of single-use keys tied to an individual customer, the product release server 102 verifies that the customer's identity (e.g. as determined by email address or login credentials) matches the identity of the customer as known by the product release server. Alternatively, the customer device 106 is able to submit the key when attempting to access the prepurchase page in step 604 and is granted or withheld access to the page based on whether the key is verified by the product release server 102. Alternatively, step 606 is able to be omitted if the event is not a private event. In some embodiments, the product release server 102 further determines if the customer device 106 has satisfied some or all of the conditions associated with the prepurchase event and adjusts the product price and/or permits/prevents the purchase of the product based on which of the conditions are satisfied.

If the key is validated by the product release server 102, the product is added to the shopping cart database for the customer at the step 608. The customer device 106 then authorizes or executes the submission of payment information to the payment processor 110 for the product either directly or via the product release server 102 at the step 610. The payment processor validates the payment order and transmits the payment or payment credit indicated by the payment information to the servers 102 at the step 612 (if the payment method or amount is fails validation of the payment processor, the payment process reports back to the product release server 102 since payment is one of the conditions for authorizing the completion of a product purchase, and the purchase is denied until the customer corrects the problem.

Once an order is approved by the payment processor, the product release server 102 completes the order using an order database and removes the product from the shopping cart database of the customer at the steps 614 and 616. Finally, the product release server 102 makes available and/or initiates delivery of the product to the customer at the step 618. In some embodiments, the product file is transmitted to the customer's device 106. Alternatively, the product file is able to be transferred to a customer account database associated with the product release server 102 and/or stored for access via a cloud storage repository, such that the file becomes available for download and/or streaming to the customer's device 106. As a result, the method provides the advantage of enabling sellers to generate and manage custom prepurchase events where customers are able to purchase and take receipt of new products before the products are available to the general public.

Advantages

Thus, the product release system 100 described herein has numerous advantages. Specifically, the system provides the advantage of improvement in the technical field of ecommerce by providing the unconventional feature of enabling a user to generate product listings with generalized release dates along with customized prepurchase events.

Conventional internet-based product releasing entities provide features that are largely controlled by the entities themselves (e.g. features that are created by the entities themselves and often hard coded such that product controllers are limited to the predefined functions presented by on the institution website). In contrast, in the described product release system 100 product controllers themselves are enabled to design and adjust the features and in particular to generate and customize one or more prepurchase events in order to list, launch and sell their product. As a result, the product release functions are able to be as dynamic as needed for each product controller, rather than generically forced by the institution and limited to its functional decisions. Thus, the technical field is improved as new product releases are no longer constrained by the limitations of a single product release date.

In other words, the system, method and device provide the benefit of enabling controllers of physical or digital goods and services to create, update and manage product listings that are a part of the product release server 102 and/or a third party server's 112 catalog, whereby such product listings are able to support a plurality of product release events including prepurchase events. The system, method and device provide the benefit of an interface by which prospective customers can browse, consider, purchase and receive said products or services utilizing the generated prepurchase events.

Additionally, the product release system enables a more expansive temporal timeline for new product introductions conducted over ecommerce than is possible with the conventional approach to new product introductions.

Early access has value and appeal to consumers, and this system enables product controllers to exploit that value while also adding value and excitement to the customer's purchase experience. This system will enable the entire ecommerce supply chain to benefit from this important new method of product launch marketing, and importantly and necessarily, to do it at scale. Scale matters, because without the ability for the product release server 102 and/or a third party server 112 to efficiently publish and update product listings for upcoming new products that may offer a theoretically unlimited number of prepurchase events and support a theoretically unlimited number of product listing updates by the product controller (i.e. updates/changes to a product listing as controlled by the product controller), and without the ability to quickly update and publish these dynamic listings the product controller can change at any time, these millions of product controllers and their billions of consumers would be shut out of this exciting opportunity to benefit from prepurchase events.

The system is able touch key members of the product supply chain involved in helping product controllers take their new products to market via ecommerce. This disclosure describes a product release system that can be operated by an online merchant, a product creator, a distributor and/or other entity and/or by multiple members of the product supply chain in isolation or in cooperation. The systems, methods and devices disclosed herein enable product controllers to fracture the conventional timeline of new product introductions, where product launches are treated as one-time events, by transforming the single product launch into multiple launch events that can be targeted at different customer segments, and each launch event able to activate on different dates with different incentives and purchase conditions calibrated to the product marketing goals of the product controller. These individually marketable product launch events are executed at the product release server 102 and/or a third party server 112 under the shared control of the product controllers. The present invention offers the creators of new products and services myriad new customizable opportunities to make their products visible, differentiatable and desirable to more customers. Product controllers can leverage the customer allure of early access to new products to forge greater customer satisfaction and loyalty.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiments chosen for illustration without departing from the spirit and scope of the invention as defined by the claims. For example, although the platform is described as having a separate product database (storing product data), prepurchase event database (storing prepurchase data), user database (storing user account information and/or user contact information), orders database (storing preorder information), shopping cart database and/or other databases, it is understood that one or more of the databases are able to be combined and/or split into separate databases. Additionally, it is understood that although the platform is described as comprising various modules, the names of these modules are arbitrary. The module labels are an artificial construct to assist those skilled in the art to gain a full and transparent understanding of the systems, methods and devices that comprise the invention. It is understood that those skilled in the art have the ability to mix and match the functions embodied within the modules, or to abandon the module concept altogether. Further, although the description above relates primarily to the sales and/or purchase of the products and/or services, these sales and/or purchases are able to be replaced and/or supplemented with rentals, leases, subscriptions and/or other types of transactions related to the products/services (e.g. where ownership of the products/services is not fully conveyed as it is in a sale, or product access is ephemeral).

In some embodiments, the product release system described herein is able to be operated independently by multiple supply chain participants, while also allowing the operators of these independent systems to collaborate on the creation and execution of the same prepurchase event. For example, a product creator may use a distributor-operated portion of the product release system to supply their distributor the product, product data and event data associated with an upcoming product launch event. The distributor will then distribute the product, product data and event data to one or more online merchants, who will then use this data and the product assets to construct the product listings by which the merchant will merchandise one or more launch events (a general release event and one or more prepurchase events) to its customers. In this example, the product creator's relationship is with the distributor, not the merchant, and the distributor assumes certain tasks and responsibilities so that the merchant doesn't have to. Thus, different supply chain participants are able to collaborate by utilizing different aspects of the same product release system.

In some embodiments, if the product creator were not working with a distributor, and instead working directly with a merchant-operated product release system, then the merchant's portion of the product release system is able to handle the full range of product release system capabilities, from ingestion and validation of product listings to the merchandising and fulfillment of the products to customers. The supply chain participants employing various aspects of the product release system described herein as product controllers are able to comprise product creators (e.g. manufacturers, brands, publishers, independent authors, musicians, artists, rights holders, craftspeople, service providers, sellers or other types of product creators), distributors (i.e. companies that aggregate products and product data on behalf of multiple product creators, and supply these products and product listings to one or more online merchants) and online merchants (i.e. companies that sell or provide products and/or services directly to end customers, such as online retailers, online marketplaces, subscription services, streaming services, app stores, and/or any website or mobile app with ecommerce capabilities), to generate and administer customized prepurchase events at scale giving customers—or certain selected subgroups of customers—the opportunity to browse, purchase and/or access or receive upcoming new products before their official product introduction dates.

As described above, the products described herein are able to comprise digital books (e.g. ebooks). Alternatively or in addition, the products are able to comprise physical/non-digital products or services that can be sold over ecommerce networks to end consumers. For example, the products are able to comprise any new physical or digital product or service that has a scheduled future general release date and can be merchandised online, such as, but not limited to, printed books; apparel; toys; electronics; food and beverages; consulting services; financial products and services; travel & hospitality services including lodging; real estate, ebooks; recorded audio such as audio books, podcasts, and music; video and filmed entertainment; educational courseware; downloadable applications and software; packaged software; video games; artwork and images; and other products and combinations thereof. Also, for the avoidance of any confusion, the events described throughout this disclosure are able to comprise product release dates and preorder periods. For example, when a future product introduction goes on preorder, or on prepurchase, it is able to be referred to as a preorder event, or a prepurchase event, and that event is able to comprise a start date and an end date, and for the duration of these events prospective customers, if authorized, are able to place purchase orders that entitle them to receive the forthcoming new product introductions earlier than the general public. As described herein, the term "page" is able to refer to a webpage, a website, an application screen/page, a user interface and/or any other type of digital page.

Additionally, although some examples in the description herein focus on digital book products (e.g. ebooks), it is understood that the products are able to be other digital products. Alternatively, in some embodiments the products are able to be physical products in addition to or instead of digital products. In such embodiments, it is understood that the delivery of the physical product involves the facilitation of a physical delivery (packaging, routing, medium, and other delivery parameters), rather than a digital delivery as described herein.

What is claimed is:

1. A product release system for enabling prepurchase of one or more products, the product release system comprising:

one or more servers including a processor and a non-transitory computer-readable medium coupled with the processor, storing a product release platform having a platform user interface, wherein the product release platform is operable to:

generate a product listing identifying a product based on product data, wherein the product data includes a product release date that is in the future;

enable selection of digital coupon parameters including price adjustment information and an expiration condition, generate one or more custom digital coupons for the product based on the digital coupon parameters, and upon redemption of one of the digital coupons before the expiration condition, adjust a price of the product based on the price adjustment information;

provide the platform user interface for generating a prepurchase event, wherein the platform user interface:

displays a set of products including the product, the set of products associated with a product controller account on the product release platform;

enables selection, with the product controller account, of the product from the set of products;

enables selection of a starting time for the prepurchase event with the product controller account; and enables selection of an end condition for the prepurchase event with the product controller account;

receive selections of the product, the starting time and the end condition;

generate the prepurchase event based on the product, the starting time and the end condition when an inventory status indicates the product is available for delivery to one or more customers, wherein the prepurchase event includes a purchase function that enables the one or more customers to complete a purchase transaction to purchase and obtain the product before the product release date, wherein the starting time is before the product release date;

automatically cancel or refrain from generating the prepurchase event when the inventory status indicates the product is not available for delivery to the one or more customers; and for the prepurchase event, in advance of the product release date, facilitate purchase of the product by the one or more customers using the purchase function and provide access to the product to the one or more customers during the prepurchase event.

2. The product release system of claim 1, wherein the product release platform is operable to:

generate one or more prepurchase keys for the prepurchase event, wherein completion of the purchase transaction provided by the prepurchase event requires input of one or more of the prepurchase keys; and receive one or more input keys from the one or more customers;

wherein the facilitating the purchase of the product includes determining if the one or more input keys correspond to the prepurchase keys associated with the prepurchase event, wherein each input key of the one or more input keys is included within a hyperlink that links to a page associated with the prepurchase event of the input key and submits the input key to the product release platform for determining if the input key corresponds to the prepurchase keys associated with the prepurchase event.

3. The product release system of claim 2, wherein the prepurchase event includes one or more prepurchase conditions, and further wherein the product release platform is operable to prevent sales of the product to one or more of the customers even if the input key corresponds to the prepurchase keys associated with the prepurchase event if the one or more of the customers have not satisfied the prepurchase conditions.

4. The product release system of claim 3, wherein the prepurchase conditions comprise one or more of submitting contact information, purchasing or subscribing to one or more other products, spending a threshold amount of money, and agreeing to a terms of use of the product.

5. The product release system of claim 4, wherein the product release platform is operable to add the contact information submitted to satisfy the prepurchase conditions of the prepurchase event to the product controller account.

6. The product release system of claim 1, wherein the end condition is one or more of an end time, a quantity of sales, a maximum quantity of customers accessing the prepurchase event, an inventory status of the product, and a manual cancellation of the event, and further wherein, upon reaching the end condition the product release platform is operable to terminate the prepurchase event.

7. The product release system of claim 1, wherein the platform user interface enables the selection of pricing data for the prepurchase event with the product controller account, and further wherein the pricing data is a pricing metric that indicates a price value for the starting time and at least one different price value for one or more subsequent times between the starting time and an end of the prepurchase event as indicated by the end condition.

8. The product release system of claim 1, wherein the product release platform is operable to generate a prepurchase listing that identifies the product.

9. The product release system of claim 1, wherein the product data includes a content file containing the product and the content file comprises one or more of the group consisting of: a product, an image, a video, audio, and a computer application.

10. A product release system for enabling prepurchase of one or more products, the product release system comprising:

one or more servers including a processor and a non-transitory computer-readable medium coupled with the processor, storing a product release platform having a platform user interface, wherein the product release platform is operable to:

generate a product listing identifying a product based on product data, wherein the product data includes a product release date that is in the future;

provide the platform user interface for generating a prepurchase event, wherein the platform user interface:

displays a set of-products including the product, the set of products associated with a product controller account on the product release platform;

enables selection, with the product controller account, of the product from the set of products;

enables selection of a starting time for the prepurchase event with the product controller account; and enables selection of an end condition for the prepurchase event with the product controller account;

receive selections of the product, the starting time and the end condition;

generate the prepurchase event based on the product, the starting time and the end condition, wherein the prepurchase event includes a purchase function that enables one or more customers to complete a purchase transaction to purchase and obtain the product before the product release date, wherein the starting time is before the product release date; and for the prepurchase event, in advance of the product release date, facilitate purchase of the product by the one or more customers using the purchase function and provide access to the product to the one or more customers during the prepurchase event, wherein the product release platform is operable to:

generate one or more prepurchase preorder keys;

generate one or more prepurchase preorder events that are each based on one of one or more prepurchase events and include a prepurchase event identifier of the one of the prepurchase events, a start date and an end date that are both prior to the start time of the one of the prepurchase events and a preorder function that enables the one or more customers to preorder a purchase of the product during the one of the prepurchase events;

for each of the prepurchase preorder events, facilitate preordering of the product by one or more customers during the prepurchase preorder event using the preorder function if one or more prepurchase preorder keys submitted by the customers correspond to the prepurchase preorder keys associated with the prepurchase preorder event and prevent preordering of the product by the one or more customers during the prepurchase preorder event if the one or more prepurchase preorder keys submitted by the customers do not correspond to the prepurchase preorder keys associated with the prepurchase preorder event; and in response to preordering of the product by the one or more customers using the preorder function, facilitate the preordered purchase of the product by the one or more customers during the identified one of the prepurchase events using the purchase function of the one of the prepurchase events.

11. A method of enabling prepurchase of one or more products via one or more product release servers, the method comprising:

generating, with the product release servers, a product listing identifying a product based on product data, wherein the product data includes a product release date that is in the future;

enabling selection of digital coupon parameters including price adjustment information and an expiration condition, generating one or more custom digital coupons for the product based on the digital coupon parameters, and upon redemption of one of the digital coupons before the expiration condition, adjusting a price of the product based on the price adjustment information;

providing, with the product release servers, a platform user interface for generating a prepurchase event, wherein the platform user interface:

displays a set of products including the product, the set of products associated with a product controller account on the product release platform;

enables selection, with the product controller account, of the product from the set of products;

enables selection of a starting time for the prepurchase event with the product controller account; and enables selection of an end condition for the prepurchase event with the product controller account;

receiving selections of the product, the starting time and the end condition;

generating the prepurchase event based on the product, the starting time and the end condition when an inventory status indicates the product is available for delivery to one or more customers, wherein the prepurchase event includes a purchase function that enables the one or more customers to complete a purchase transaction to purchase and obtain the product before the product release date, wherein the starting time is before the product release date;

automatically cancel or refrain from generating the prepurchase event when the inventory status indicates the product is not available for delivery to the one or more customers; and in advance of the product release date, with the product release servers, facilitating purchase of the product by the one or more customers using the purchase function and providing access to the product to the one or more customers during the prepurchase event.

12. The method of claim 11, further comprising, with the product release servers:

generating one or more prepurchase keys for the prepurchase event, wherein completion of the purchase transaction provided by the prepurchase event requires input of one or more of the prepurchase keys; and receiving one or more input keys from the one or more customers;

wherein the facilitating of the purchase of the product includes determining if the one or more input keys correspond to the prepurchase keys associated with the prepurchase event, wherein each input key of the one or more input keys is included within a hyperlink that links to a page associated with the prepurchase event of the input key and submits the input key to the product release servers for determining if the input key corresponds to the prepurchase keys associated with the prepurchase event.

13. The method of claim 12, wherein the prepurchase event includes one or more prepurchase conditions, further comprising preventing sales of the product to one or more of the customers with the product release servers even if the input key corresponds to the prepurchase keys associated with the prepurchase event if the one or more of the customers have not satisfied the prepurchase conditions.

14. The method of claim 13, wherein the prepurchase conditions comprise one or more of submitting contact information, purchasing or subscribing to one or more other products, spending a threshold amount of money and agreeing to a terms of use of the product.

15. The method of claim 14, further comprising adding the contact information submitted to satisfy the prepurchase conditions of the prepurchase event to the product controller account.

16. The method of claim 11, wherein the end condition is one or more of an end time, a quantity of sales, a maximum quantity of customers accessing the prepurchase event, an inventory status of the product and manual cancellation of the event, and further wherein upon reaching the end condition the product release platform is operable to terminate the prepurchase event.

17. The method of claim 11, wherein the platform user interface enables the selection of pricing data for the prepurchase event with the product controller account, and further wherein the pricing data is a pricing metric that indicates a price value for the starting time and at least one different price value for one or more subsequent times between the starting time and an end of the prepurchase event as indicated by the end condition.

18. The method of claim 11, further comprising generating with the product release servers a prepurchase listing that identifies the product.

19. The method of claim 11, wherein the product data includes a content file containing the product and the content file comprises one or more of the group consisting of: a product, an image, a video, audio, and a computer application.

20. A method of enabling prepurchase of one or more products via one or more product release servers, the method comprising:

generating, with the product release servers, a product listing identifying a product based on product data, wherein the product data includes a product release date that is in the future;

providing, with the product release servers, a platform user interface for generating a prepurchase event, wherein the platform user interface:

displays a set of products including the product, the set of products associated with a product controller account on the product release platform;

enables selection, with the product controller account, of the product from the set of products;

enables selection of a starting time for the prepurchase event with the product controller account; and enables selection of an end condition for the prepurchase event with the product controller account;

receiving selections of the product, the starting time and the end condition;

generating the prepurchase event based on the product, the starting time and the end condition, wherein the prepurchase event includes a purchase function that enables one or more customers to complete a purchase transaction to purchase and obtain the product before the product release date, wherein the starting time is before the product release date; and in advance of the product release date, with the product release servers, facilitating purchase of the product by the one or more customers using the purchase function and providing access to the product to the one or more customers during the prepurchase event, further comprising, with the product release servers:

generating one or more prepurchase preorder keys;

generating one or more prepurchase preorder events that are each based on one of one or more prepurchase events and include a prepurchase event identifier of the one of the prepurchase events, a start date and an end date that are both prior to the start time of the one of the prepurchase events and a preorder function that enables the one or more customers to preorder a purchase of the product during the one of the prepurchase events;

for each of the prepurchase preorder events, with the product release servers, facilitating preordering of the product by one or more customers during the prepurchase preorder event using the preorder function if one or more prepurchase preorder keys submitted by the customers correspond to the prepurchase preorder keys associated with the prepurchase preorder event and preventing preordering of the product by the one or more customers during the prepurchase preorder event if the one or more prepurchase preorder keys submitted by the customers do not correspond to the prepurchase preorder keys associated with the prepurchase preorder event; and in response to preordering of the product by the one or more customers using the preorder function, facilitate the preordered purchase of the product by the one or more customers during the identified one of the prepurchase events with the product release servers using the purchase function of the one of the prepurchase events.

21. A non-transitory computer-readable medium storing a product release platform configured to:

generate a product listing identifying a product based on product data, wherein the product data includes a product release date that is in the future;

enable selection of digital coupon parameters including price adjustment information and an expiration condition, generate one or more custom digital coupons for the product based on the digital coupon parameters, and upon redemption of one of the digital coupons before the expiration condition, adjust a price of the product based on the price adjustment information;

provide a platform user interface for generating a prepurchase event, wherein the platform user interface:

displays a set of products including the product, the set of products associated with a product controller account on the product release platform;

enables selection, with the product controller account, of the product from the set of products;

enables selection of a starting time for the prepurchase event with the product controller account; and enables selection of an end condition for the prepurchase event with the product controller account;

receive selections of the product, the starting time and the end condition;

generate the prepurchase event based on the product, the starting time and the end condition when an inventory status indicates the product is available for delivery to one or more customers, wherein the prepurchase event includes a purchase function that enables the one or more customers to complete a purchase transaction to purchase and obtain the product before the product release date, wherein the starting time is before the product release date;

automatically cancel or refrain from generating the prepurchase event when the inventory status indicates the product is not available for delivery to the one or more customers; and in advance of the product release date, facilitate purchase of the product by the one or more customers using the purchase function and provide access to the product to the one or more customers during the prepurchase event.

22. The medium of claim 21, wherein the product release platform is operable to:

generate one or more prepurchase keys for the prepurchase event, wherein completion of the purchase transaction provided by the prepurchase event requires input of one or more of the prepurchase keys; and receive one or more input keys from the one or more customers;

wherein the facilitating the purchase of the product includes determining if the one or more input keys correspond to the prepurchase keys associated with the prepurchase event, wherein each input key of the one or more input keys is included within a hyperlink that links to a page associated with the prepurchase event of the input key and submits the input key to the product release platform for determining if the input key corresponds to the prepurchase keys associated with the prepurchase event.

23. The medium of claim 22, wherein the prepurchase event includes one or more prepurchase conditions, and further wherein the product release platform is operable to prevent sales of the product to one or more of the customers even if the input key corresponds to the prepurchase keys associated with the prepurchase event if the one or more of the customers have not satisfied the prepurchase conditions.

24. The medium of claim 23, wherein the prepurchase conditions comprise one or more of submitting contact information, purchasing or subscribing to one or more other products, spending a threshold amount of money and agreeing to a terms of use of the product.

25. The medium of claim 24, wherein the product release platform is operable to add the contact information submitted to satisfy the prepurchase conditions of the prepurchase event to the product controller account.

26. The medium of claim 21, wherein the end condition is one or more of an end time, a quantity of sales, a maximum quantity of customers accessing the prepurchase event, an inventory status of the product and manual cancellation of the event, and further wherein upon reaching the end condition the product release platform is operable to terminate the prepurchase event.

27. The medium of claim 21, wherein the platform user interface enables the selection of pricing data for the prepurchase event with the product controller account, and further wherein the pricing data is a pricing metric that indicates a price value for the starting time and at least one different price value for one or more subsequent times between the starting time and an end of the prepurchase event as indicated by the end condition.

28. The medium of claim 21, wherein the product release platform is operable to generate a prepurchase page that identifies the product.

29. The medium of claim 21, wherein the product data includes a content file containing the product and the content file comprises one or more of the group consisting of: a product, an image, a video, audio, and a computer application.

30. A non-transitory computer-readable medium storing a product release platform configured to:

generate a product listing identifying a product based on product data, wherein the product data includes a product release date that is in the future;

provide a platform user interface for generating a prepurchase event, wherein the platform user interface:

displays a set of products including the product, the set of products associated with a product controller account on the product release platform;

enables selection, with the product controller account, of the product from the set of products;

enables selection of a starting time for the prepurchase event with the product controller account; and enables selection of an end condition for the prepurchase event with the product controller account;

receive selections of the product, the starting time and the end condition;

generate the prepurchase event based on the product, the starting time and the end condition, wherein the prepurchase event includes a purchase function that enables one or more customers to complete a purchase transaction to purchase and obtain the product before the product release date, wherein the starting time is before the product release date; and in advance of the product release date, facilitate purchase of the product by the one or more customers using the purchase function and provide access to the product to the one or more customers during the prepurchase event, wherein the product release platform is operable to:

generate one or more prepurchase preorder keys;

generate one or more prepurchase preorder events that are each based on one of one or more prepurchase events and include a prepurchase event identifier of the one of the prepurchase events, a start date and an end date that are both prior to the start time of the one of the prepurchase events and a preorder function that enables the one or more customers to preorder a purchase of the product during the one of the prepurchase events;

for each of the prepurchase preorder events, facilitate preordering of the product by one or more customers during the prepurchase preorder event using the preorder function if one or more prepurchase preorder keys submitted by the customers correspond to the prepurchase preorder keys associated with the prepurchase preorder event and prevent preordering of the product by the one or more customers during the prepurchase preorder event if the one or more prepurchase preorder keys submitted by the customers do not correspond to the prepurchase preorder keys associated with the prepurchase preorder event; and in response to preordering of the product by the one or more customers using the preorder function, facilitate the preordered purchase of the product by the one or more customers during the identified one of the prepurchase events using the purchase function of the one of the prepurchase events.

31. A product release system for enabling prepurchase of one or more products, the product release system comprising:

one or more servers including a processor and a non-transitory computer-readable medium coupled with the processor, storing a product release platform having a platform user interface, wherein the product release platform is operable to:

generate a product listing identifying a product based on product data, wherein the product data includes a product release date that is in the future;

provide the platform user interface for generating a prepurchase event, wherein the platform user interface:

displays a set of products including the product, the set of products associated with a product controller account on the product release platform;

enables selection, with the product controller account, of the product from the set of products;

enables selection of a starting time for the prepurchase event with the product controller account;

enables selection of an end condition for the prepurchase event with the product controller account; and enables the adjustment of the starting time and the end condition of the prepurchase event;

receive selections of the product, the starting time and the end condition;

generate the prepurchase event based on the product, the starting time and the end condition, wherein the prepurchase event includes a purchase function that enables one or more customers to complete a purchase transaction to purchase and obtain the product before the product release date, wherein the starting time is before the product release date; and in advance of the product release date, facilitate purchase of the product by the one or more customers using the purchase function.

32. The product release system of claim 31, wherein the end condition is one or more of an end time, a quantity of sales, a maximum quantity of customers accessing the prepurchase event, an inventory status of the product and a manual cancellation of the event, and further wherein upon reaching the end condition the product release platform is operable to terminate the prepurchase event.

33. The product release system of claim 31, wherein the platform user interface enables the selection of pricing data for the prepurchase event with the product controller account, and further wherein the pricing data is a pricing metric that indicates a price value for the starting time and at least one different price value for one or more subsequent times between the starting time and an end of the prepurchase event as indicated by the end condition.

34. The product release system of claim 31, wherein the prepurchase event includes one or more prepurchase conditions, and further wherein the product release platform is operable to prevent sales of the product to one or more of the customers if the one or more of the customers have not satisfied the prepurchase conditions, wherein the product release platform prevents purchase of the product by rejecting the purchase transactions for the product initiated by the one or more customers with the purchase function of the prepurchase event.

35. The product release system of claim 34, wherein the prepurchase conditions comprise one or more of submitting contact information, purchasing or subscribing to one or more other products, spending a threshold amount of money and agreeing to a terms of use of the product.

36. The product release system of claim 31, wherein the product release platform is operable to generate a prepurchase page that identifies the product.

37. The product release system of claim 31, wherein the product release platform is operable to:

generate one or more prepurchase preorder events based on one of one or more prepurchase events and prepurchase preorder data for the product, wherein the prepurchase preorder events include a preorder function that enables the one or more customers to preorder a purchase of the product during the one of the prepurchase events, and further wherein the prepurchase preorder data includes information that identifies the one of the prepurchase events;

for each of the prepurchase preorder events, facilitate preordering of the product by one or more customers during the prepurchase preorder event using the preorder function; and in response to preordering of the product by the one or more customers using the preorder function, facilitate the preordered purchase of the product by the one or more customers during the identified one of the prepurchase events using the purchase function of the one of the prepurchase events.

38. The product release system of claim 31, wherein the product data includes a content file containing the product and the content file comprises one or more of the group consisting of: a product, an image, a video, audio, a computer application.

* * * * *